(12) United States Patent
Ooishi et al.

(10) Patent No.: US 7,395,912 B2
(45) Date of Patent: Jul. 8, 2008

(54) OPERATING ASSIST DEVICE FOR VEHICLE CLUTCH

(75) Inventors: Akifumi Ooishi, Shizuoka-ken (JP); Yousuke Ishida, Shizuoka-ken (JP)

(73) Assignee: Yamaha Hatsudoki Kabushiki Kaisha, Shizuoka-Ken (JP)

(*) Notice: Subject to any disclaimer, the term of this patent is extended or adjusted under 35 U.S.C. 154(b) by 241 days.

(21) Appl. No.: 11/328,714

(22) Filed: Jan. 9, 2006

(65) Prior Publication Data

US 2006/0169561 A1    Aug. 3, 2006

(30) Foreign Application Priority Data

Jan. 7, 2005   (JP)   ............... 2005-002872
Apr. 26, 2005  (JP)   ............... 2005-128069

(51) Int. Cl.
*F16D 23/12* (2006.01)

(52) U.S. Cl. .................. 192/99 S; 192/101

(58) Field of Classification Search ........... 192/101
See application file for complete search history.

(56) References Cited

U.S. PATENT DOCUMENTS

| | | | | |
|---|---|---|---|---|
| 1,267,999 A | * | 5/1918 | Fretz | 192/89.26 |
| 2,111,281 A | * | 3/1938 | Dodge | 192/99 S |
| 3,187,867 A | * | 6/1965 | Sink | 192/89.26 |
| 3,199,366 A | * | 8/1965 | Herrington, Jr. | 74/512 |
| 3,261,438 A | * | 7/1966 | Binder | 192/99 S |
| 3,302,763 A | * | 2/1967 | Wobrock | 192/89.2 |
| 4,393,907 A | * | 7/1983 | Kronstadt | 192/99 S |
| 4,624,152 A | * | 11/1986 | Stotz et al. | 74/518 |
| 4,655,332 A | * | 4/1987 | Herbulot et al. | 192/70.28 |
| 5,044,223 A | * | 9/1991 | Mizuma et al. | 74/512 |

(Continued)

FOREIGN PATENT DOCUMENTS

DE    2019412 A1    12/1971

(Continued)

OTHER PUBLICATIONS

European Search Report Dated Mar. 8, 2006, for Application No. EP 05028673.

*Primary Examiner*—Sherry Estremsky
(74) *Attorney, Agent, or Firm*—Knobbe Martens Olson & Bear LLP

(57) ABSTRACT

A clutch mechanism includes a friction clutch with a clutch spring, a clutch lever connected to the friction clutch via clutch wires and being manually operable against the urging force of the clutch spring, and a clutch assisting device. The clutch assist device has an assist mechanism having an auxiliary force member (e.g., a spring) that urges the clutch wires in such a direction as to disengage the friction clutch while the clutch lever is moved from a disengage start position, where the clutch lever receives the reactive force of the clutch spring, to a disengaged position, where the disengagement of the friction clutch is completed. The assist mechanism maintains the urging force of the auxiliary spring applied to the clutch wires within a fixed range while the clutch lever is shifted from the midpoint between the disengage start position and the disengaged position to the disengage position. The clutch assist device reduces the manual force required to operate the clutch while preserving the operational feel of the clutch lever when moving the lever from a released position to a half clutched position, to a full clutch position.

18 Claims, 37 Drawing Sheets

U.S. PATENT DOCUMENTS

| | | | |
|---|---|---|---|
| 5,495,928 A * | 3/1996 | Sando | 192/89.29 |
| 6,050,379 A * | 4/2000 | Lyon | 192/54.1 |
| 2005/0011719 A1* | 1/2005 | Oishi et al. | 192/99 S |
| 2005/0072648 A1* | 4/2005 | Peppard et al. | 192/99 R |
| 2005/0252748 A1* | 11/2005 | Oishi et al. | 192/99 S |
| 2007/0205072 A1* | 9/2007 | Villata et al. | 192/85 C |

FOREIGN PATENT DOCUMENTS

| | | |
|---|---|---|
| EP | 1498346 A | 1/2005 |
| JP | 7-132872 | 5/1995 |

* cited by examiner

OPERATING ASSIST DEVICE FOR VEHICLE CLUTCH

CROSS-REFERENCE TO RELATED APPLICATIONS

This application is based on and claims priority under 35 U.S.C. § 119(a)-(d) to Japanese Patent Application No. 2005-128069, filed Apr. 26, 2005, and to Japanese Patent Application No. 2005-002872, filed Jan. 7, 2005, the entire contents of which are hereby incorporated by reference.

BACKGROUND OF THE INVENTION

1. Field of the Invention

The present invention relates to a clutch assist device which can reduce the force necessary to operate a friction clutch to engage and disengage a transmission of a vehicle.

2. Description of the Related Art

An engine unit of a vehicle, for example a motorcycle, is often equipped with a friction clutch that operates to engage and disengage a transmission. With the clutch engaged, the transmission transfers torque from the engine crankshaft to one or more wheels of the motorcycle and, with the clutch disengaged, the transmission is decoupled from the engine so as not transfer a driving torque to the wheel(s). The friction clutch typically has friction plates and clutch plates laid alternately next to one another. A clutch spring presses the friction plates against the clutch plates and biases the friction plates into this state so as to transmit torque.

The clutch has a clutch release mechanism. The clutch release mechanism, which is used to release the pressure against the friction plates caused by the clutch spring, is coupled to a clutch operating lever via a clutch wire. A Bowden-wire cable is often used as the clutch wire and includes an inner wire that slides relative to an outer sheath. The clutch operating lever is usually disposed on the handlebars of the motorcycle. When the rider squeezes the clutch operating lever, the friction plates are separated from the clutch plates, against the urging force of the clutch spring, to disengage the clutch and, hence, the transmission from the engine.

With a friction clutch used in a high-power, high-revolution engine, it is desired to set the biasing load of the clutch spring to a high value to increase the torque capacity of the clutch. However, since the clutch operating lever is operated manually, it often is difficult for at least some riders to operate the clutch operating lever when the biasing load of the clutch spring is increased.

A clutch assist mechanism has been previously proposed to reduce the force necessary to actuate the clutch operating lever. See Japanese Patent Publication No. Hei 7-132872. The clutch assist device disclosed in this patent publication is incorporated in a clutch release mechanism to which the clutch wire is connected.

The conventional assist mechanism has an arm rotatable together with a push lever of the clutch release mechanism and a spring unit disposed between an end of the arm and the engine. The spring unit has a spring holder which can expand and contract in its axial direction and a compression coil spring for urging the spring holder in the direction in which the spring holder expands. The spring holder has a first end rotatably connected to the end of the arm and a second end rotatably connected to a bracket extending from the engine.

In the conventional assist mechanism, the center of rotation of the arm and the first and second ends of the spring holder are aligned on one straight line when the clutch operating lever is operated by a distance corresponding to its free play (i.e., movement of the clutch operating lever before disengagement of the clutch start). Therefore, the urging force of the compression coil spring acts in such a direction as to compress the arm and does not act as a force (moment) to rotate the arm.

However, when the clutch lever is rotated beyond the free play range, the joint between the end of the arm and the first end of the spring holder is offset from the straight line connecting the center of rotation of the arm and the second end of the spring holder. Therefore, the urging force of the compression coil spring acts in such a direction as to rotate the arm, and the arm is forcibly rotated in such a direction to disengage the friction clutch. As a result, the urging force of the compression coil spring is added to the force applied to operate the clutch lever and the force necessary to operate the clutch lever to disengage the friction clutch is reduced.

According to the clutch operating device disclosed in the above-noted Japanese patent publication, when the clutch lever is rotated to a disengage start position at the end of the free play range, the urging force of the clutch spring is applied to the clutch lever. The compression coil spring of the assist mechanism expands to cancel the urging force of the clutch spring in synchronization with the operation of the clutch lever in such a direction as to disengage the friction clutch after the clutch lever has passed the disengage start position.

In the clutch operating device, however, the compression coil spring of the assist mechanism can freely expand after the clutch lever has passed the disengage start position. Therefore, the urging force of the compression coil spring applied from the arm to the push lever is not controlled. That is, since an end of the spring holder is directly connected to an end of the arm and the spring unit rotates in the same manner as the arm, the magnitude of the urging force applied to the push lever is left uncontrolled.

Thus, it is not possible to prevent the clutch lever from suddenly becoming light as it gets close to a disengage position where the friction clutch is disengaged while the clutch lever is moved to disengage the friction clutch. Therefore, the operating feel of the clutch lever is unnatural, and there is still room for improvement in terms of the operability of the clutch lever.

When the clutch lever is moved to disengage the friction clutch, the force necessary to operate the clutch lever is preferably small especially in the first half between the disengage start position and the disengage position (the half on the side of the disengage start position). That is, it is preferable to reduce the force necessary to operate the clutch lever in the initial stage of what is called half-clutch operation. However, with the conventional clutch operation device, a large force is necessary in the first stage of the half-clutch operation. Therefore, there is also room for improvement in terms of the operability of the clutch lever in this respect.

A need therefore exists for a clutch operation assisting device with which the operation of the operating element when disengaging the clutch does not feel awkward and which can improve the operability of the assist mechanism.

SUMMARY OF THE INVENTION

An aspect of the present invention involves a clutch mechanism for a vehicle comprising a clutch assist device operating between a clutch and a clutch operator. The clutch operator is connected to the clutch by a transmitting component. The clutch includes a clutch element, which is biased toward an engaged position and is movable by the clutch operator and the transmitting component from the engaged position to a disengaged position. A clutch assist device operates between the clutch an the transmitting component. The clutch assist device comprises an auxiliary force member, which is disposed relative to the transmitting component, at least when the clutch operator is moved to disengage the clutch element, to apply an assist force to the transmitting component. The assist force is applied in such a direction as to assist disengaging the clutch element while the clutch operator is moved from a disengage start position, at which point the clutch operator works against the bias of the clutch spring, to a disengaged position where the clutch element is in the disengaged position. The assist force of the auxiliary force member, which is applied to the transmitting component, is maintained within a fixed range while the clutch operator is moved from an intermediate position, lying between the disengage start position and the disengaged position, to the disengage position.

Accordingly, when the clutch operator is operated in such a direction as to disengage the clutch, the urging force of the auxiliary force member is added to the force applied by the clutch operator. Therefore, the clutch lever is more easily operated.

In addition, the urging force of the auxiliary force member applied to the transmitting component does not increase over a fixed range even when the clutch operator gets close to the disengaged position. Consequently, the manual force operating operator lever is prevented from suddenly becoming light as the operator nears the disengaged position. The clutch assist device thus reduces the manual force required to operate the clutch while preserving the operational feel of the clutch operator when moving the operator from a released position to a half clutched position, to a full clutch position.

An additional aspect of the present invention involves a clutch assist device for incorporation into a clutch mechanism. The clutch mechanism includes a friction clutch with a clutch spring, a transmitting component connected to the friction clutch, and a clutch operator which is connected to the transmitting component and which changes the engagement state of the friction clutch when operated against the urging force of the clutch spring. The clutch assist device comprises a movable member that is movable in synchronization with the clutch operator and a rotatable member. An auxiliary elastic member for applying an urging force to rotate the rotatable member, is pivotal through a fixed path with movement of the movable member. A cam mechanism is interposed between the movable member and the rotatable member for transmitting the urging force applied to the rotatable member to the movable member. When the clutch operator is operated in such a direction as to disengage the friction clutch, the auxiliary elastic member applies an urging force to move the movable member in such a direction as to assist disengaging the friction clutch while the clutch operator is moved from a disengage start position, at which point the clutch operator works against the bias of the clutch spring, to a disengaged position where the clutch element is in the disengaged position.

In a preferred mode, the rotatable member and the cam mechanism are interposed between the auxiliary elastic member and the movable member. Since the auxiliary elastic member oscillates through the fixed path, the direction of the urging force can be freely changed. Therefore, the urging force can be always applied in a desired direction, and the loss of the urging force applied to the movable member can be reduced although a cam mechanism is interposed between the auxiliary elastic member and the movable member. In addition, the wear of the components in the clutch assist device can be reduced, and the service life and reliability of the clutch assist device can be improved.

Also, since the cam mechanism is interposed between the auxiliary elastic member and the movable member, the relation between the auxiliary elastic member and the movement of the movable member can be freely set. Therefore, the variation characteristics of the urging force applied to the movable member (in other words, the variation characteristics of the urging force at the time when the clutch operator is operated) can be easily set according to the application and performance criteria. Therefore, the operability of the clutch lever can be further improved by, for example, reducing the force necessary to operate the clutch lever immediately after the disengagement of the friction clutch has started.

BRIEF DESCRIPTION OF THE DRAWINGS

These and other features, aspects, and advantages of the present invention will now be described in connection with preferred embodiments of the invention, in reference to the accompanying drawings. The illustrated embodiments, however, are merely examples and are not intended to limit the invention. The drawings include the following thirty-five figures.

FIG. 4 illustrates a state of the clutch assist device at the time when a clutch operating lever is fully released.

DETAILED DESCRIPTION OF THE PREFERRED EMBODIMENT

The following describes two examples of embodiments that the present clutch assist device can take with reference to the drawings. In the following embodiments, a clutch operating device and a clutch assist device, which are configured in accordance with aspects of the present invention, are applied to a motorcycle. The clutch operating device and the clutch assist device, however, are applicable to other types of vehicles, including other types of straddle-type vehicles, including, without limitation, to scooters, ATVs, snowmobiles and the like.

For the purpose of describing the embodiments below, several terms of orientations are used to describe the motorcycle, the clutch assist device, and the components of the motorcycle with which the clutch assist device operates. Terms such as, for example, "up," "down," "left," "right," "vertical," "horizontal," "higher," "upper," "lower," "front," and "back" are used from the perspective of the motorcycle orientation shown in FIG. 1 and in manner consistent with the ordinary meaning of these terms; however, the clutch assist device and the associated components of the motorcycle can assume different orientations than those illustrated in the embodiments. Hence, it is not intended that such terms of orientation limit the invention.

First Embodiment

Figure 1:
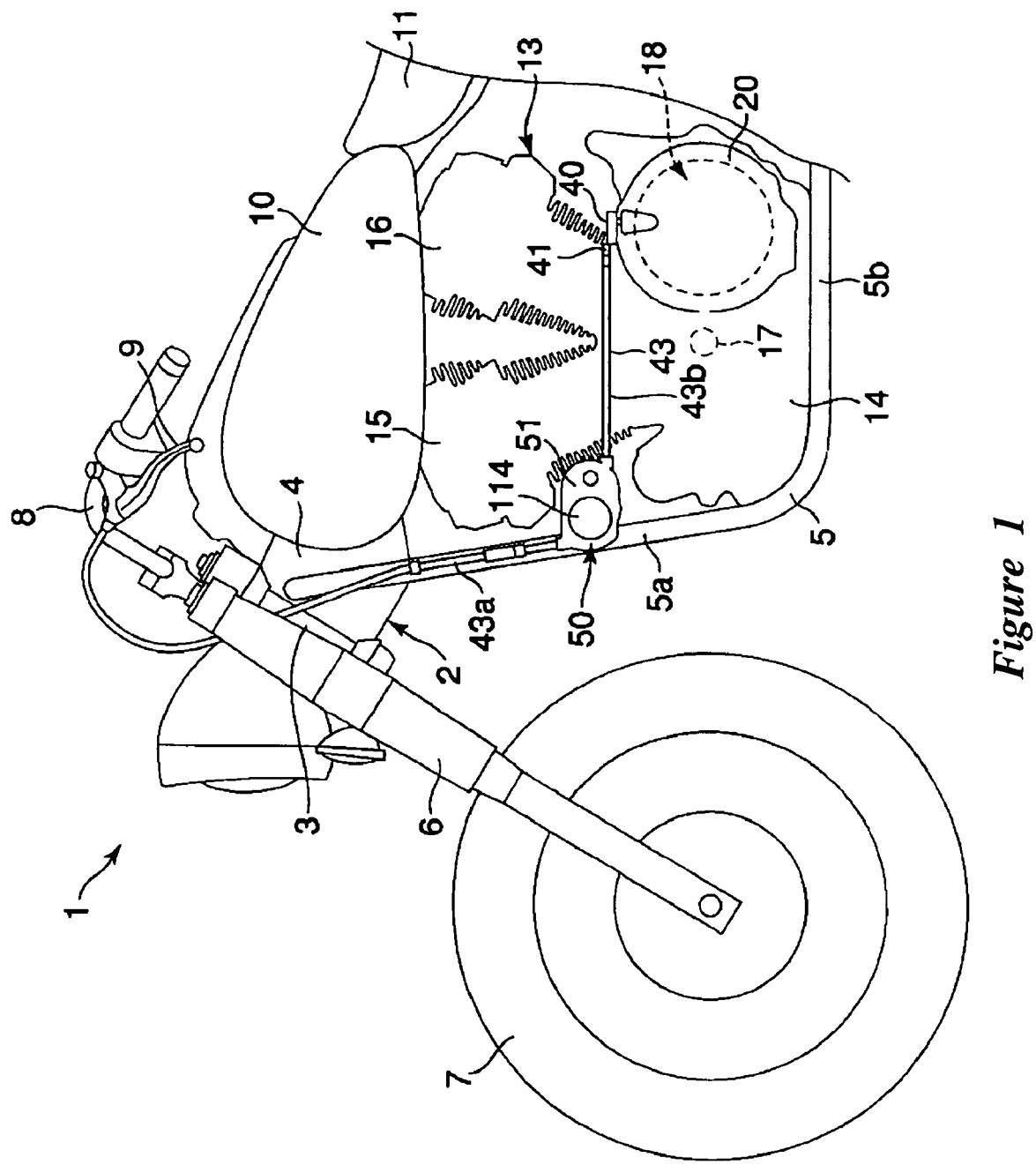
FIG. 1 is a partial side view of a motorcycle including a clutch assist device configured in accordance with an embodiment of the present invention. The motorcycle is shown in an upright position on a generally flat surface.
Figure 2:
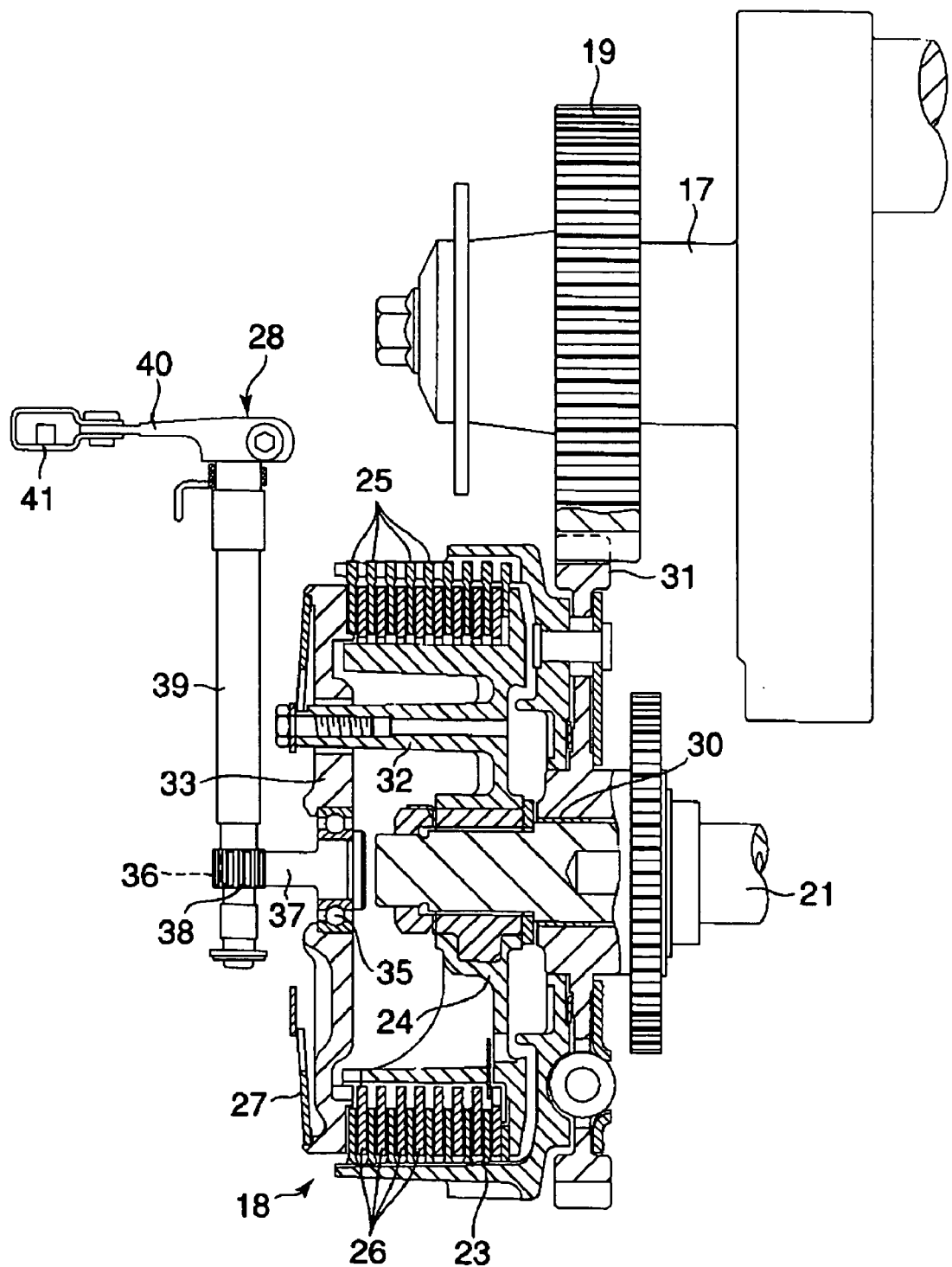
FIG. 2 is a cross-sectional view of an example of a friction clutch that can be used with the embodiments of the clutch assist device and with the motorcycle illustrated in FIG. 1.

With initial reference to FIGS. 1 and 2, a motorcycle, which includes the present clutch assist device, has a frame 2. The frame 2 includes a steering head pipe 3, a main frame member 4 and a down tube 5. The steering head pipe 3 supports a front fork 6. To the upper end of the front fork 6 is secured a handlebar 8 for steering a front wheel 7. A clutch lever 9 is attached to the left end of the handlebar 8. The clutch lever 9 is one example of the type of clutch operator with which the present clutch assist device can be used. While the clutch operator is manually operated by hand in this embodiment, the clutch operator can be operated by foot or otherwise by the vehicle's rider.

The main frame member 4 extends backward from the steering head pipe 3. The main frame member 4 supports a fuel tank 10 and a seat 11. The down tube 5 has a first portion 5a extending downward from the front end of the main frame member 4 and a second portion 5b extending backward from the lower end of the first portion 5a.

The frame 2 supports an engine, preferably a V-twin cylinder engine 13. In the illustrated embodiment, the engine 13 has a crankcase 14, a front cylinder 15 and a rear cylinder 16. The front cylinder 15 and the rear cylinder 16 protrude from an upper surface of the crankcase 14 toward the fuel tank 10 above the crankcase 14.

The down tube 5 of the frame 2 preferably holds the engine 13. The first portion 5a of the down tube 5 extends vertically, directly in front of the engine 13, and the second portion 5b of the down tube 5 extends longitudinally under the crankcase 14.

As shown in FIGS. 1 and 2, the crankcase 14 preferably houses a crankshaft 17 and a wet multi-plate friction clutch 18. The crankshaft 17 is disposed horizontally in the vehicle width direction, and a speed reduction small gear 19 is secured to the left end of the crankshaft 17. The friction clutch 18 is located behind the speed reduction small gear 19 and at the left end in the crankcase 14. The friction clutch 18 is covered with a clutch cover 20 attached to the left side of the crankcase 14.

The friction clutch 18 is used to engage or disengage the transmission of torque from the crankshaft 17 to an input shaft 21 of a transmission and is manually operated when the rider squeezes the clutch lever 9 with a hand. As shown in FIG. 2, the friction clutch 18 has a clutch housing 23, a clutch boss 24, a plurality of friction plates 25, a plurality of clutch plates 26, a clutch spring 27 and a clutch release mechanism 28.

The clutch housing 23 is rotatably supported on the left end of the input shaft 21 via a bearing 30. A speed reduction large gear 31 is coaxially connected to an end of the clutch housing 23. The speed reduction large gear 31 meshes with the speed reduction small gear 19. This engagement allows the torque from the crankshaft 17 to be transmitted to the clutch housing 23.

The clutch boss 24 is secured to the left end of the input shaft 21 so as to rotate with the input shaft 21. The clutch boss 24 is surrounded by the clutch housing 23 and has a plurality of boss parts 32 (only one of which is shown in FIG. 2) protruding toward the clutch cover 20.

The friction plates 25 are supported on the outer periphery of the clutch housing 23. The friction plates 25 are rotatable together with the clutch housing 23 and are arranged coaxially in the axial direction of the input shaft 21 with intervals therebetween.

The clutch plates 26 are supported on the outer periphery of the clutch boss 24. The clutch plates 26 are rotatable together with the clutch boss 24, and each of the clutch plates 26 extends between adjacent friction plates 25. Therefore, the friction plates 25 and the clutch plates 26 are arranged alternately in the clutch housing 23.

In this embodiment, a diaphragm spring is used as the clutch spring 27. The clutch spring 27 is located on the left side of the clutch housing 23 and the clutch boss 24 and supported on the ends of the boss parts 32. The clutch spring 27 constantly presses the friction plates 25 against the clutch plates 26 via a pressure plate 33. A frictional force is thereby generated between the friction plates 25 and the clutch plates 26 and maintains the frictional clutch 18 in an engaged state capable of transmitting torque.

The clutch release mechanism 28 is used to release the pressure on the friction plates 25 caused by the clutch spring 27. In this embodiment, the clutch release mechanism 28 is a rack and pinion type. The clutch release mechanism 28 has a push rod 37 having a rack 36, and a push lever shaft 39 having a pinion 38.

The push rod 37 is rotatably supported at the center of the pressure plate 33 by a bearing 35 and is located coaxially with the input shaft 21. The push rod 37 is also supported by a clutch cover 20 for sliding movement in directions toward and away from the input shaft 21.

The push lever shaft 39 is rotatably supported by the clutch cover 20. The push lever shaft 39 extends in a vertical direction and perpendicular to the push rod 37, and the pinion 38 of the push lever shaft 39 meshes with the rack 36 of the push rod 37. The upper end of the push lever shaft 39 protrudes upward from the clutch cover 20. One end of a push lever 40 is secured to the upper end of the push lever shaft 39. The push lever 40 extends horizontally from the upper end of the push lever shaft 39 and has a wire connecting part 41 at its other end.

The wire connecting part 41 of the push lever 40 is connected to the clutch lever 9 via a clutch wire 43 (see FIG. 1). When the rider squeezes the clutch lever 9 with a hand, the other end of the push lever 40 is pulled via the clutch wire 43 to rotate the push lever shaft 39. The rotation of the push lever shaft 39 is converted to linear motion through the meshing of the pinion 38 with the rack 36. Therefore, the pressure plate 33 is slid in a direction away from the friction plates 25 against the biasing force of the clutch spring 27 to release the pressure contact between the friction plates 25 and the clutch plates 26. As a result, the friction clutch 18 is shifted to a disengaged state in which the transmission of torque is ceased. The push lever shaft 39, the push lever 40, the clutch wire 43 and so on constitute a transmitter for transmitting the operating force applied to the clutch lever 9 to the frictional clutch 18.

Therefore, the clutch lever 9 is rotatable between a return or fully released position where the friction clutch 18 is maintained in the engaged state and a disengaged position where the frictional clutch 18 is in the disengaged state. Since the clutch lever 9 has some degree of free play (for example, 10 to 15 mm from the return position as measured at the end of the clutch lever 9), the engaged state is maintained even when the clutch lever 9 is squeezed within this range. The clutch wire 43 is pulled only slightly and the urging force of the clutch spring 27 is not transmitted to the clutch lever 9 when the clutch lever 9 is operated within this free play range. The position where the free play of the clutch lever 9 ends is a disengage start position (see FIG. 15). When the clutch lever 9 is in the disengage start position, the biasing force of the clutch spring 27 acts on the clutch lever 9 via the clutch wire 43.

Figure 15:
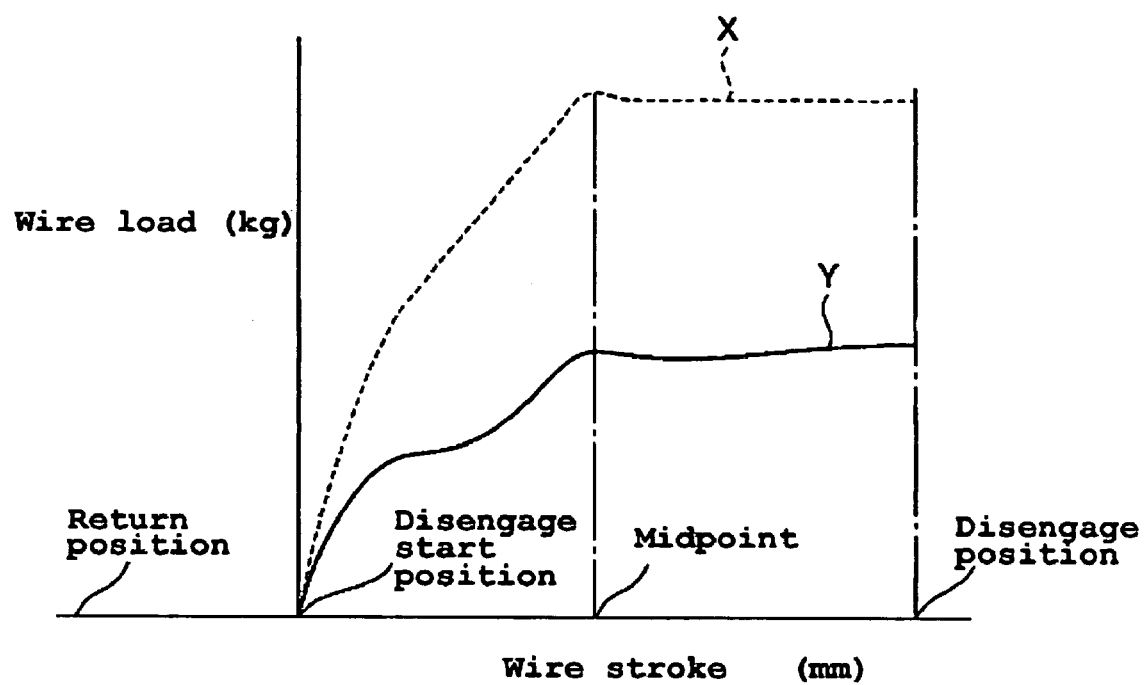
FIG. 15 is a graph showing the changes of the loads applied to a clutch push lever and a clutch operating lever, as a result of the clutch assist device of the first embodiment, when the clutch operating lever is moved to disengage the friction clutch.

FIG. 15 shows the relation between the stroke amount of the clutch wire 43 and the wire load at the time when the clutch lever 9 is moved from the fully released position to the disengaged position. In FIG. 15, curve X shows the change of the load applied to the push lever 40 via the clutch spring 27.

As can be understood from curve X, when the clutch lever 9 reaches the disengage start position from the return position, a load (reactive force) is applied to the push lever 40 by the clutch spring 27. The load rapidly increases with the increase in the stroke amount of the clutch wire 43, and keeps a generally constant value after the clutch lever 9 has passed the midpoint between the disengage start position and the disengaged position. In this embodiment, the point where the load applied to the push lever 40 becomes generally constant is the midpoint between the disengage start position and the disengaged position. However, the point where the load becomes generally constant may be a point between the disengage start position and the disengaged position other than the midpoint depending on the setting conditions of the push lever 40, the type of the friction clutch 18, etc. The point where the load becomes generally constant is not limited to the midpoint. The load applied to the push lever 40 is transmitted to the clutch lever 9 via the clutch wire 43. Therefore, when the biasing load of the clutch spring 27 is set to a high value to increase the torque capacity of the friction clutch 18, the clutch lever 9 will be stiff to operate.

In this embodiment, a clutch assist device 50 is installed at an intermediate point of the clutch wire 43 to reduce the manual load required to operate the clutch lever 9. In other words, the clutch wire 43 has a first clutch wire 43a connected to the clutch lever 9 and a second clutch wire 43b connected to the push lever 40, and the first clutch wire 43a and the second clutch wire 43b are connected to each other via the clutch assist device 50.

Figure 4:
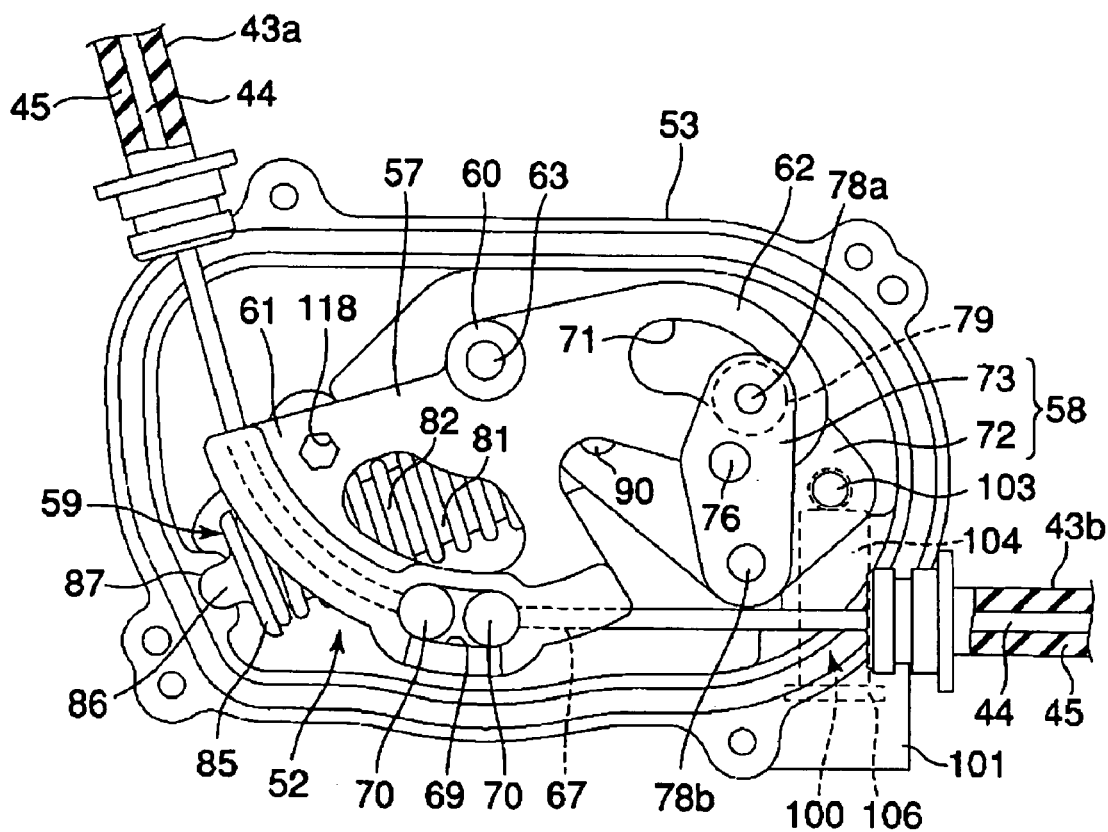
FIG. 4 is a side view of the clutch assist device of FIG. 3 with one side of the device's housing removed to illustrate the internal components the device.

As shown in FIG. 4, each of the first clutch wire 43a and the second clutch wire 43b preferably has a metal inner wire and a synthetic resin outer tube or sheath 45 surrounding the inner wire 44. The inner wires 44 are slidably in contact with the outer tubes 45, and the both ends of the inner wires 44 protrude from both ends of the outer tubes 45.

As shown in FIG. 3 to FIG. 7, the clutch assist device 50 has an exterior case 51 and an assist mechanism 52 housed in the exterior case 51. The exterior case 51 preferably is made of a metal material such as an aluminum alloy. The outer surfaces of the exterior case 51 can be plated to improve the appearance of the exterior case 51. The outer surfaces of the exterior case 51 may alternatively be painted.

The exterior case 51 has a case body 53 and a case cover 54. The case body 53 has a dish-like shape opening toward the left of the engine 13 and is supported on the first portion 5a of the down tube 5 via a bracket (not shown). The case cover 54 is fixed to the case body 53 by a plurality of bolts 55 and covers the open end of the case body 53. The exterior case 51 is positioned at generally the same height as the push lever 40 when the motorcycle 1 is viewed from its left side.

As shown in FIG. 4 to FIG. 9, the assist mechanism 52 in the present embodiment includes the first rotatable member 57, a second rotatable member 58 and a spring unit 59. The first rotatable member 57 preferably is formed of metal by stamping, for example. The first rotatable member 57 has a pivot part 60, a wire connecting part 61 and a lever part 62.

Figure 6:
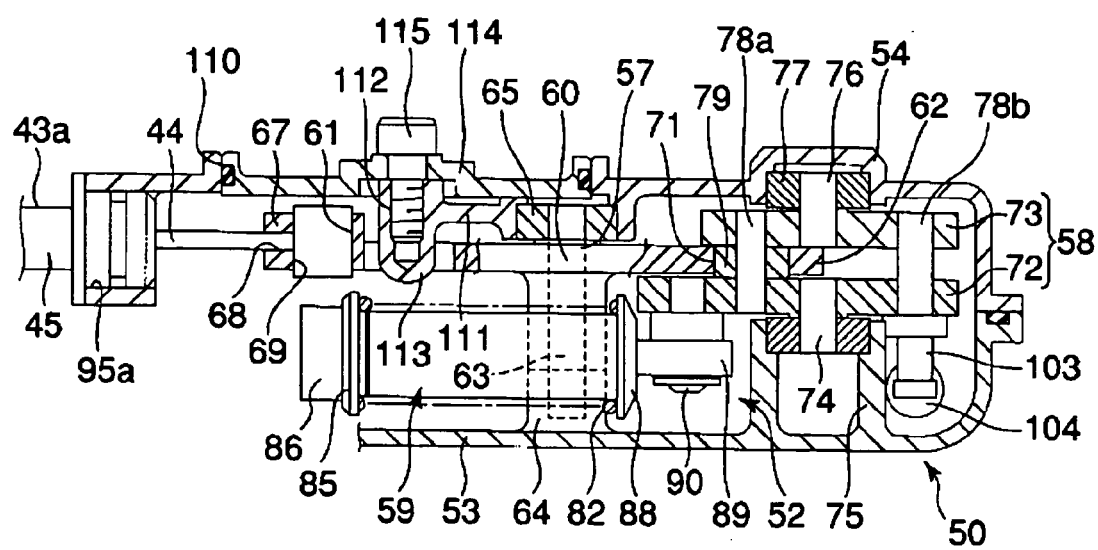
FIG. 6 is a cross-sectional view of the clutch assist device of FIG. 3.
Figure 9:
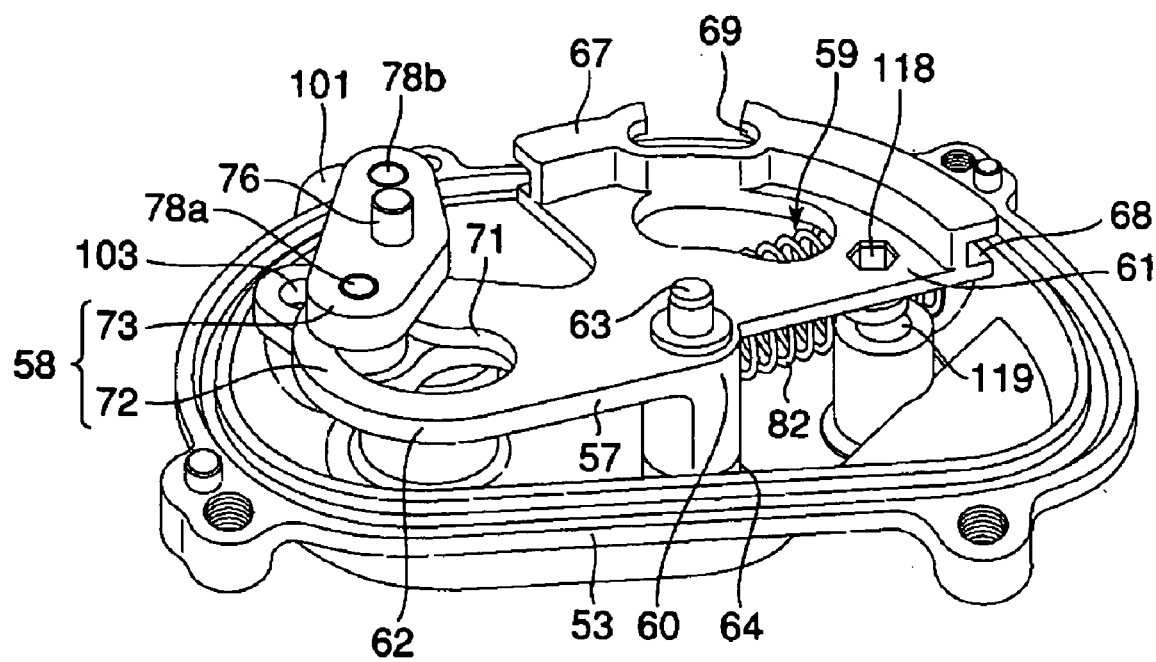
FIG. 9 is another perspective view, from a view generally opposite that of FIG. 8, of the portion of the housing body and mechanism of the first embodiment of the clutch assist device.

In the illustrated embodiment, the pivot part 60 is located between the wire connecting part 61 and the lever part 62, and is rotatably supported by a boss part 64 of the case body 53 via a first pivot shaft 63 (see FIG. 6 and FIG. 9). The end of the first pivot shaft 63 opposite the boss part 64 is supported by a bearing part 65 of the case cover 54.

As shown in FIG. 4, the wire connecting part 61 of the first rotatable member 57 is located in the front half space (in the left half in FIG. 4) in the case body 53. The wire connecting part 61 has a lower edge 67. The lower edge 67 is curved in an arc around the first pivot shaft 63. The lower edge 67 of the wire connecting part 61 has an engaging groove 68 (see FIG. 8) and an engaging hole 69. The engaging groove 68 receives the inner wire 44 of the first clutch wire 43a and the inner wire 44 of the second clutch wire 43b and opens at the outer peripheral surface of the edge 67. The engaging hole 69 is a slot elongated along the circumferential direction of the lower edge 67. The engaging hole 69 opens at the outer peripheral surface of the lower edge 67 and at the engaging groove 68. Engaging elements 70, which have cylindrical shapes and are secured to the respective ends of the inner wires 44, are engaged with the opening edge of the engaging hole 69.

Therefore, the inner wire 44 of the first clutch wire 43a and the inner wire 44 of the second clutch wire 43b are integrally connected to each other via the first rotatable member 57. This connection allows the inner wire 44 of the first clutch wire 43a and the inner wire 44 of the second clutch wire 43b to move together through the same distance.

The lever part 62 is located on the rear side in the rear half space in the case body 53. The lever part 62 has a cam groove 71. As shown in FIG. 4, the cam groove 71 is an arcuate slot and curved in a direction opposite that of the lower edge 67 of the wire connecting part 61.

The second rotatable member 58 has a link plate 72 and a link lever 73. The link plate 72 and the link lever 73 preferably are each formed of metal, by a stamping process for example, and are disposed parallel to each other with the lever part 62 of the first rotatable member 57 interposed therebetween. The link plate 72 is rotatably supported by a boss part 75 of the case body 53 (see FIG. 6) via a second pivot shaft 74 (see FIG. 5). The link lever 73 is rotatably supported by a bearing part 77 of the case cover 54 via a third pivot shaft 76 (see FIG. 4). The second pivot shaft 74 and the third pivot shaft 76 are disposed coaxially with each other.

The link plate 72 and the link lever 73 are integrally joined to each other via first and second pins 78a and 78b. The first pin 78a extends through the cam groove 71 of the first rotatable member 57. A cam follower 79, such as a roller, is rotatably supported by the first pin 78a. The cam follower 79 is located in the cam groove 71 and in contact with the inner surface of the cam groove 71.

Therefore, the cam groove 71 and the cam follower 79 can transmit the motion of the first rotatable member 57 to the second rotatable member 58 and vice versa. The cam groove 71 and the cam follower 79 constitute a cam mechanism.

Figure 5:
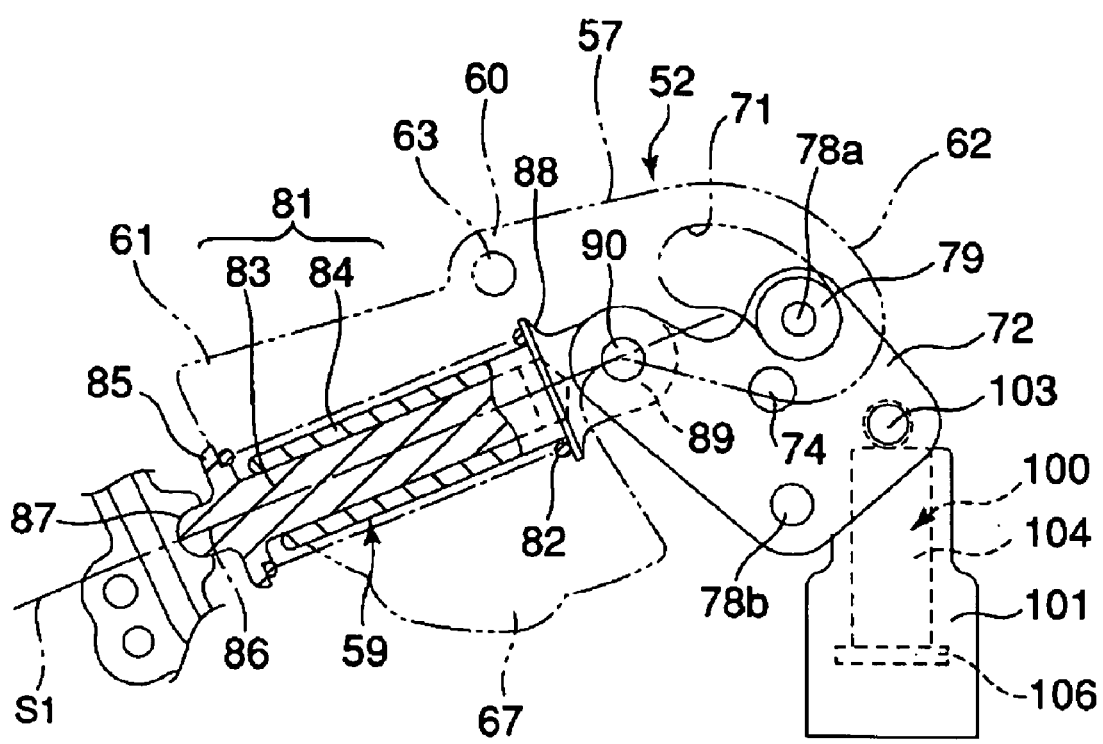
FIG. 5 is a side view, partially in cross-section, illustrating the positional relation among a link plate, a spring unit and a pressing pin of the clutch assist device of FIG. 4 at the time when the clutch operating lever is fully released.

In the illustrated embodiment, the spring unit 59 constitutes an auxiliary force member to provide an assist force when operating the clutch lever 9. The auxiliary force member, however, can take other forms, as explain below. As shown in FIG. 5, the spring unit 59 has a spring holder 81 and an auxiliary spring 82. The spring holder 81 has an inner cylinder 83 and an outer cylinder 84. The inner cylinder 83 is slidably fitted on the outer cylinder 84, which allows the spring holder 81 to expand and contract.

The inner cylinder 83 has a spring receiver 85 and a pivot end 86. The spring receiver 85 extends in a flange-like manner from an outer peripheral surface at one end of the inner cylinder 83. The pivot end 86 is located at one end of the inner cylinder 83 and is rotatably supported on a mounting seat 87 formed on a front end inside the case body 53.

The outer cylinder 84 has a spring receiver 88 and a connecting end 89. The spring receiver 88 extends in a flange-like manner from an outer peripheral surface at one end of the outer cylinder 84. The connecting end 89 is located at one end of the outer cylinder 84 and is rotatably connected to the link plate 72 of the second rotatable member 58 via a pin 90. Therefore, the spring holder 81 connects to a front end of the case body 53 and to the link plate 72 and extends generally in the longitudinal direction of the case body 53.

Figure 11:
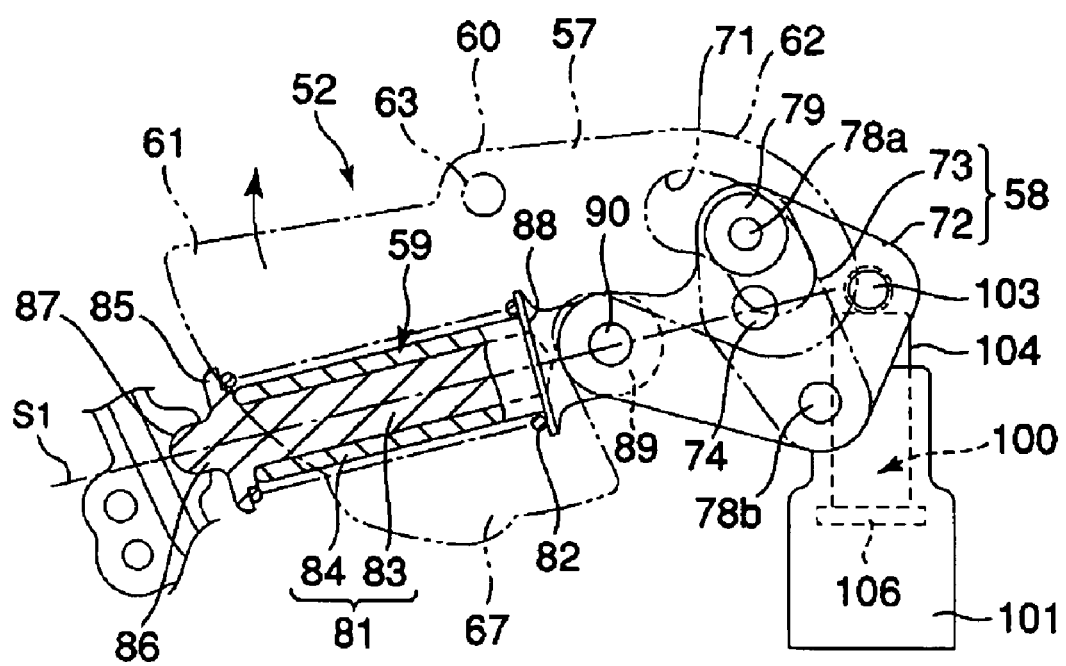
FIG. 11 is a side view, partially in cross-section, illustrating the positional relation among the link plate, the spring unit and the pressing pin at the time when the clutch operating lever is in the disengage start position in the first embodiment.
Figure 12:
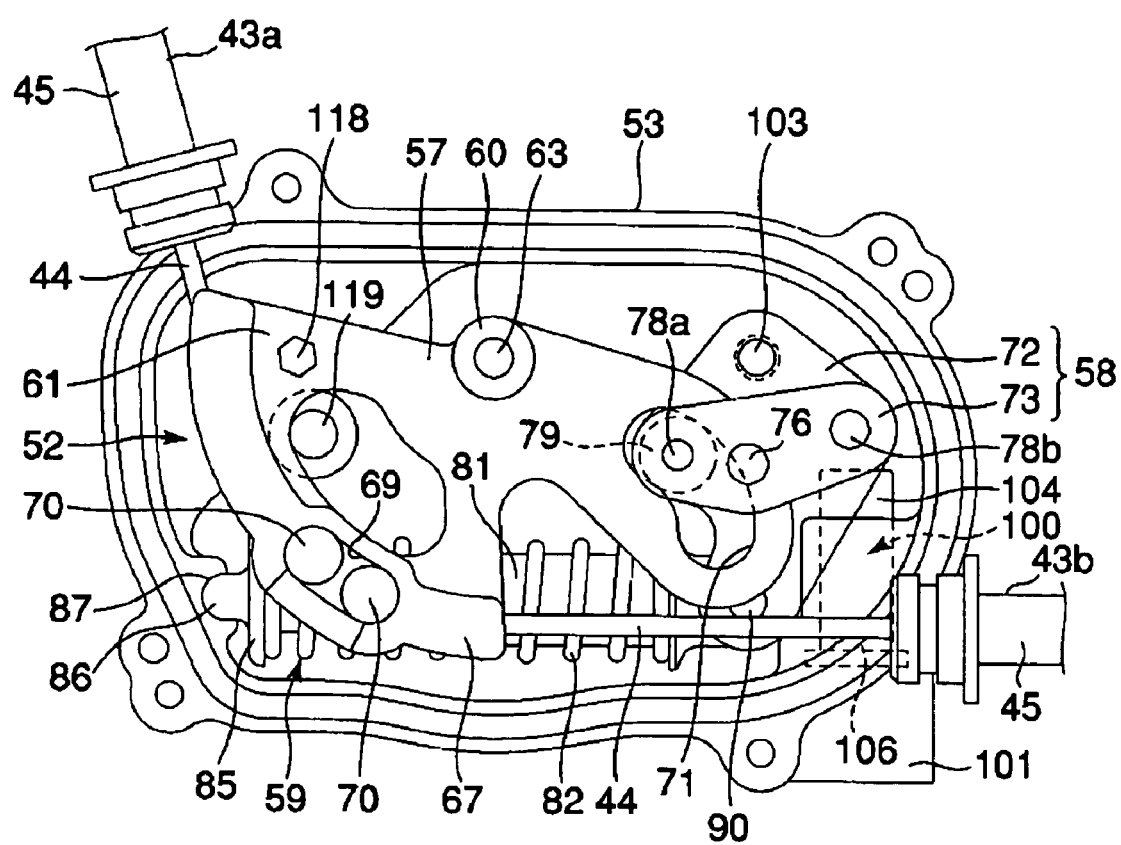
FIG. 12 is a side view of the clutch operating device of the first embodiment with a portion of the housing removed, illustrating the state of the assist mechanism at the time when the clutch operating lever is in a disengaged position.

The auxiliary spring 82 preferably is a compression coil spring and is interposed between the spring receiver 85 of the inner cylinder 83 and the spring receiver 88 of the outer cylinder 84 in a compressed state. Therefore, the spring holder 81 is constantly biased in the direction in which it expands. When the clutch lever 9 is in the disengage start position, the pivot end 86 and the connecting end 89 of the spring holder 81, and the second and third pivot shafts 74 and 76 as the center of rotation of the second rotatable member 58 are positioned on a straight line S1 as shown in FIG. 11.

Figure 3:
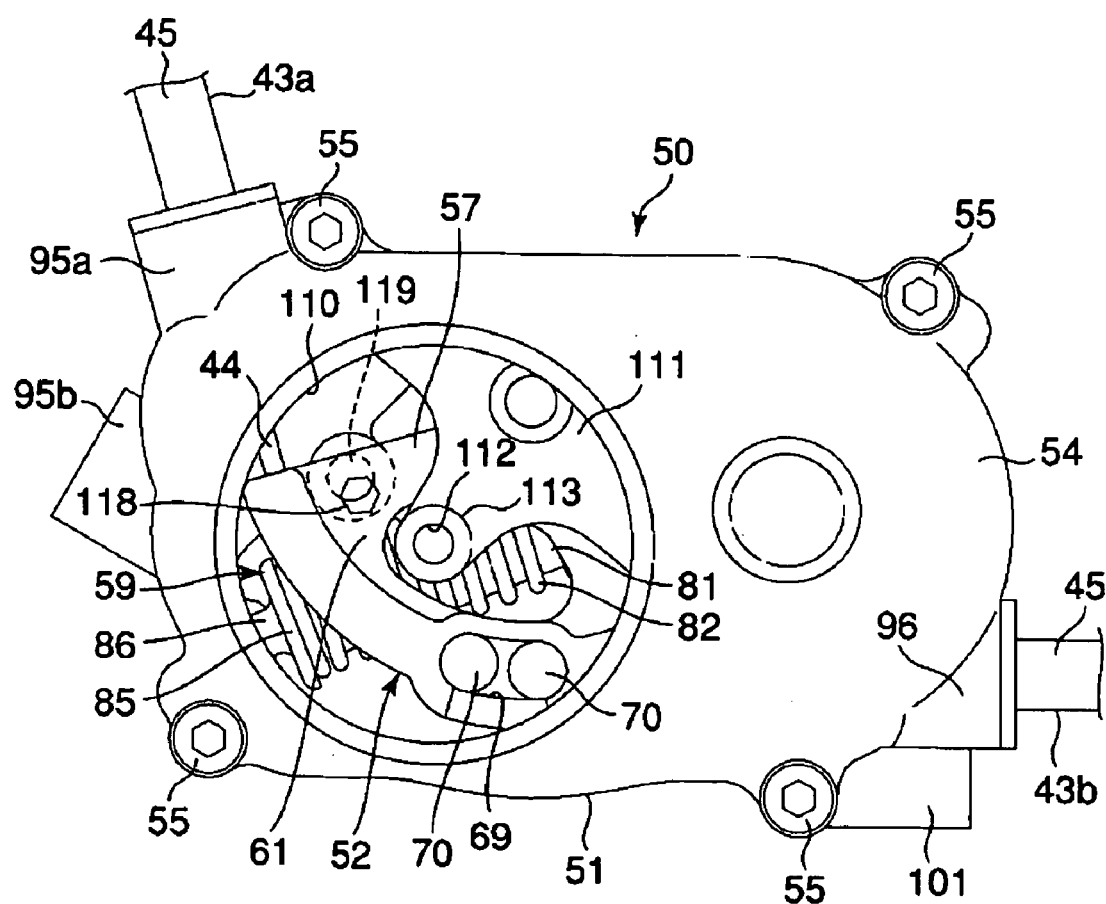
FIG. 3 is a side view of a first embodiment of the clutch assist device that can be used with the motorcycle shown in FIG. 1. A side cover of the clutch assist device is removed to expose some of the inner working of the device.
Figure 7:
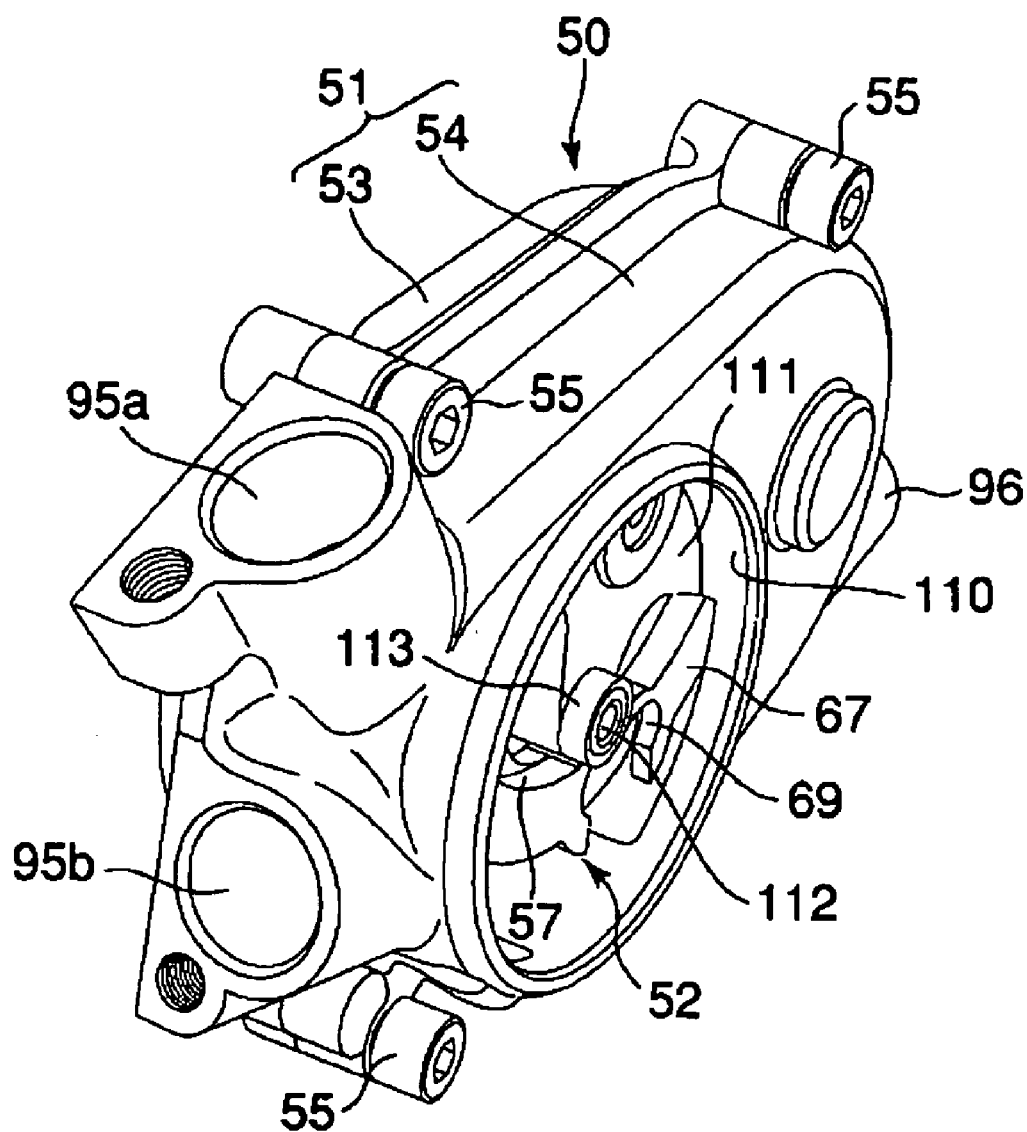
FIG. 7 is a perspective view of the clutch assist device of FIG. 3.
Figure 8:
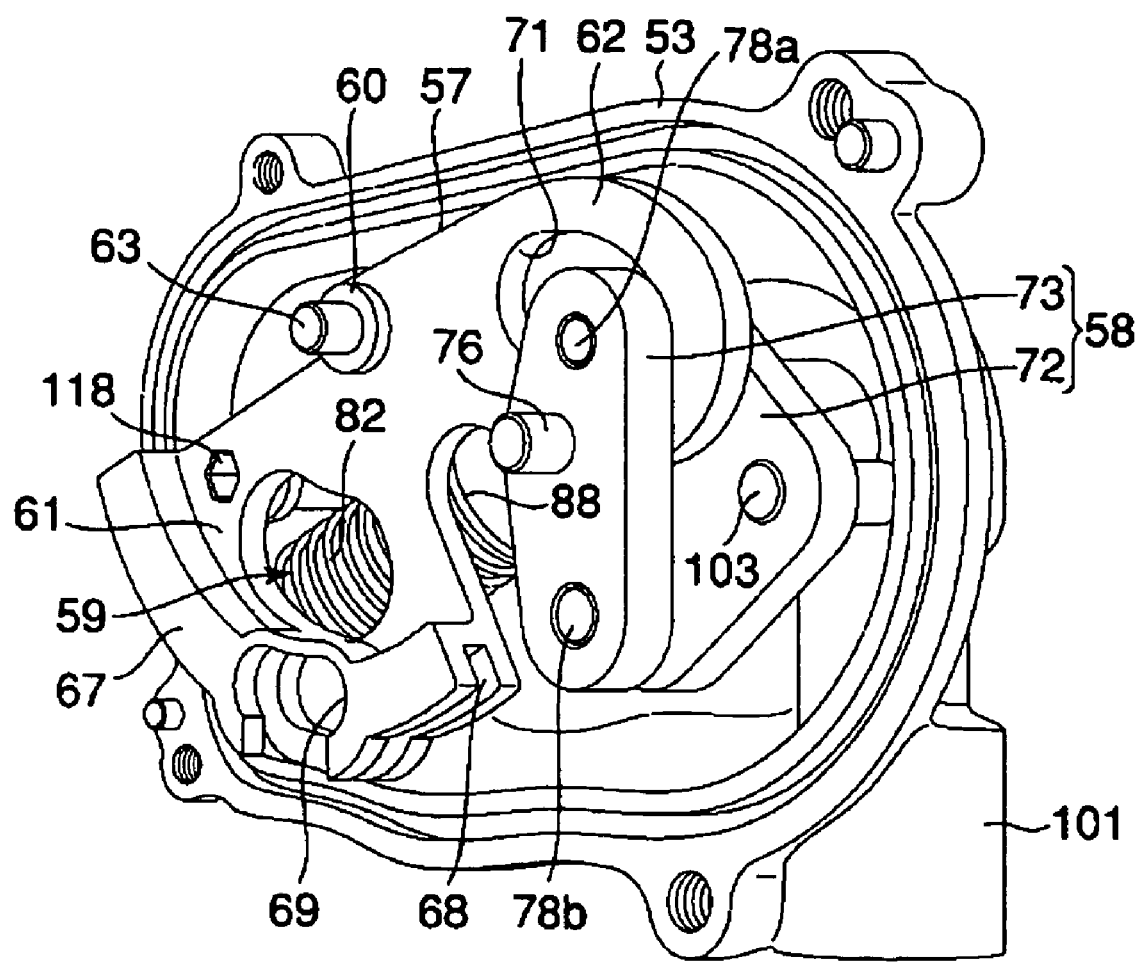
FIG. 8 is a perspective view of a portion of a housing body in which the mechanism of the clutch assist device has been incorporated in the first embodiment.

As shown in FIG. 3 and FIG. 7, the case cover 54 preferably has a pair of first wire introduction port 95a and 95b and a second wire introduction port 96. The first and second introduction ports 95a, 95b and 96 open into the exterior case 51. The first wire introduction port 95a protrudes upward from an upper part of the front end the case cover 54. The other first wire introduction port 95b protrudes obliquely upward from an intermediate part of the front end of the case cover 54. The second wire introduction port 96 protrudes backward from a lower part of the rear end of the case cover 54.

In this embodiment, the first clutch wire 43a is inserted into the first wire introduction port 95a. The inner wire 44 of the first clutch wire 43a extends into the exterior case 51 and is connected to the first rotatable member 57. The first clutch wire 43a extends upward along the first portion 5a of the down tube 5 from a front end of the exterior case 51 (see FIG. 1).

The first wire introduction port 95b is used to change the direction in which the clutch wire 43a extends from the exterior case 51. The first wire introduction port 95b is preferably closed by a dust-proof cap (not shown) to prevent entrance of dust or foreign objects into the exterior case 51 when it is not used.

The second clutch wire 43b is inserted into the second wire introduction port 96. The inner wire 44 of the second clutch wire 43b extends into the exterior case 51 and is connected to the first rotatable member 57. The second clutch wire 43b extends backward from a rear end of the exterior case 51 along the left side of the engine 13 and linearly connects the first rotatable member 57 of the assist mechanism 52 and the push lever 40 (see FIG. 1).

FIG. 4 and FIG. 5 show the state of the assist mechanism 52 at the time when the clutch lever 9 is in the fully released position. When the clutch operating lever 9 is in the fully released position, the second pivot shaft 74 of the link plate 72 and the third pivot shaft 76 of the link lever 73 are positioned below the straight line S1 connecting the pivot end 86 and the connecting end 89 of the spring holder 81. Also, the spring unit 59 is inclined such that the connecting end 89 of the spring holder 81 is positioned higher than the pivot end 86. In addition, the cam groove 71 of the link plate 72 extends in the longitudinal direction of the case body 53 and is maintained in a convex upward position.

Figure 10:
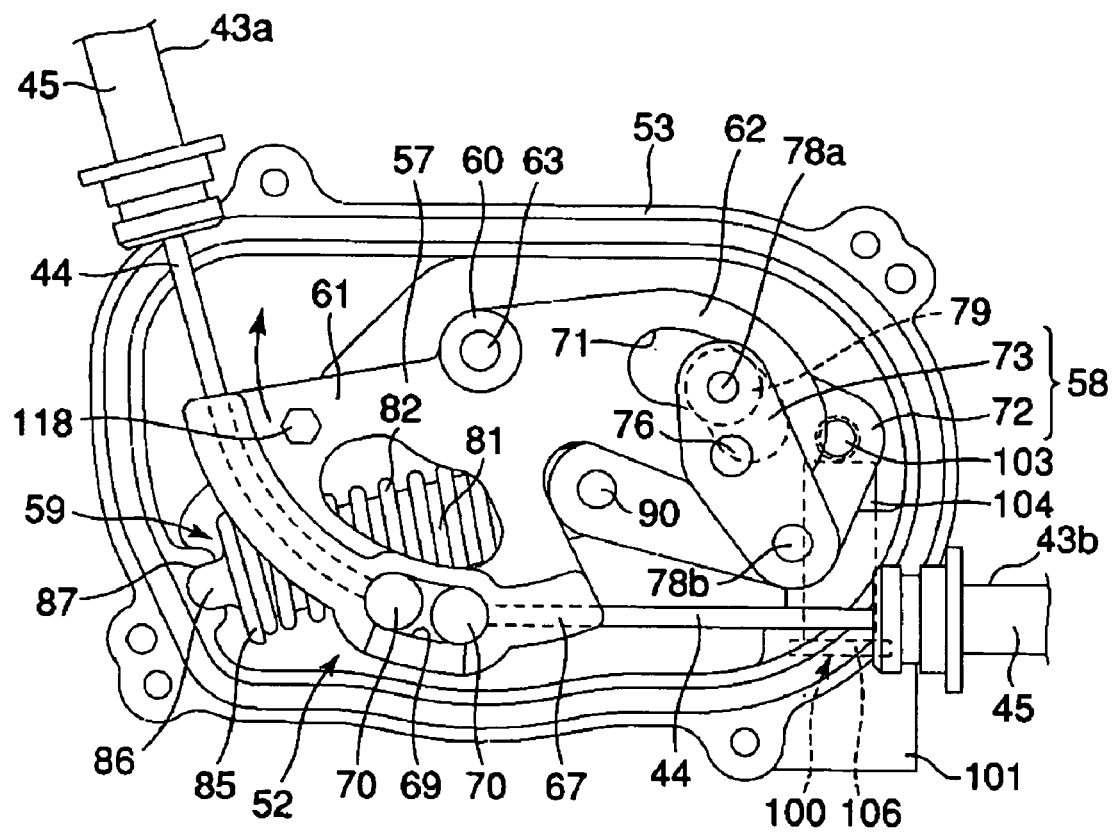
FIG. 10 is a side view of the clutch assist device of the first embodiment with a portion of the housing removed, illustrating the state of the clutch assist device at the time when the clutch operating lever has been moved to a disengage start position from the fully released position.

When the rider moves the clutch operating lever 9 from the fully released position toward the disengage start position, the first rotatable member 57 is pulled upward via the first clutch wire 43a and is rotated in the clockwise direction as indicated by the arrows in FIG. 10 and FIG. 11. The rotation of the rotatable member 57 causes the lever part 62 having the cam groove 71 to move downward. Therefore, the cam follower 79, which is in contact with the cam groove 71, receives a force; this force urges the cam follower 79 toward the front of the case body 53, and the link plate 72 and the link lever 73 are rotated in the counterclockwise direction. As a result, the spring unit 59 is rotated downward about the pivot end 86.

When the clutch operating lever 9 reaches the disengage start position, the second and third pivot shafts 74, 76 are positioned on the straight line S1 as shown in FIG. 11. Therefore, although the urging force of the auxiliary spring 82 is being applied to the link plate 72 and the link lever 73, the link plate 72 and the link lever 73 are not rotated by the urging force.

When the clutch operating lever 9 is moved from the disengage start position toward the disengage position, the first rotatable member 57 is further rotated in the clockwise direction. The rotation of the first rotatable member 57 causes the lever part 62 having the cam groove 71 to move downward, and the cam groove 71 is brought to an upright position. Therefore, the cam follower 79 in contact with the cam groove 71 receives a force which urges it obliquely downward toward the front of the case body 53, and the link plate 72 and the link lever 73 are rotated in the counterclockwise direction.

In this embodiment, when the clutch operating lever 9 is shifted from the disengage start position to the disengaged position, the spring unit 59 is rotated downward about the pivot end 86 and the straight line SI is offset to a position below the center of rotation of the link plate 72 and the link lever 73.

Therefore, the spring holder 81, which receives the urging force of the auxiliary spring 82, expands and the urging force of the auxiliary spring 82 acts to rotate the link plate 72 and the link lever 73. Thus, when the clutch operating lever 9 is moved toward the disengaged position from the disengage start position, the link plate 72 and the link lever 73 are forcibly rotated in the counterclockwise direction by the auxiliary spring 82. Therefore, the urging force of the auxiliary spring 82 is added to the operating force the rider applies to squeeze the clutch operating lever 9. Thus, less force is required by the rider to operate the clutch operating lever 9.

According to this embodiment, the cam groove 71 determines the timing at which the link plate 72 and the link lever 73 receive an urging force from the spring unit 59 and starts moving in the counterclockwise direction. More specifically, the cam groove 71 is of such a shape as to maintain the urging force of the auxiliary spring 82 applied from the link plate 72 and the link lever 73 to the first rotatable member 57 within a fixed range when the clutch lever 9 is moved from the midpoint between the disengage start position and the disengaged position toward the disengaged position. In other words, the cam groove 71 is of such a shape as to permit the movement of the link plate 72 and the link lever 73 while the clutch operating lever 9 is moved from the disengage start position to the midpoint and as to restrict the movement of the link plate 72 and the link lever 73 to prevent the auxiliary spring 82 from expanding freely while the clutch lever 9 is moved from the midpoint to the disengaged position. Therefore, in this embodiment, the cam mechanism, which is comprised of the cam groove 71 and the cam follower 79, controls the urging force of the auxiliary spring 82 applied to the first rotatable member 57.

In FIG. 15, curve designated as Y shows the change of the load applied to the clutch operating lever 9 when the clutch operating lever 9 is moved in such a direction as to disengage the friction clutch 18. As can be understood from curve Y, the load applied to the clutch lever 9 is always smaller than the load of the clutch spring 27 applied to the push lever 40 while the clutch lever 9 is shifted to the disengaged position from the disengage start position. This is because, when the link plate 72 is rotated in the counterclockwise direction by the force transmitted through the first clutch wire 43a, the urging force of the auxiliary spring 82, which forcibly urges the link plate 72 to rotate in the counterclockwise direction, is added.

In addition, in this embodiment, since the shape of the cam groove 71 is determined as described before, the load applied to the clutch operating lever 9 can be maintained generally constant while the clutch operating lever 9 is moved from the midpoint to the disengaged position. As a result, the load applied to the push lever 40 and the load applied to the clutch lever 9 change with similar characteristics with respect to the wire stroke amount as shown in FIG. 15.

As described before, when the clutch operating lever 9 is in the fully released position (i.e., the return position), the second pivot shaft 74 of the link plate 72 and the third pivot shaft 76 of the link lever 73 are positioned below the straight line S1, as shown in FIG. 4 and FIG. 5. Therefore, the link plate 72 and the link lever 73 are urged in the clockwise direction; that is, in a direction opposite the direction to disconnect the friction clutch 18, by the urging force of the auxiliary spring 82.

The force urging the link plate 72 in the clockwise direction serves as a counter assist force against the force to rotate the clutch lever 9 from the fully released position to the disengage start position. As a result, the initial input load necessary to squeeze the clutch lever 9 first is increased and the operability of the clutch lever 9 is adversely affected.

Figure 14:
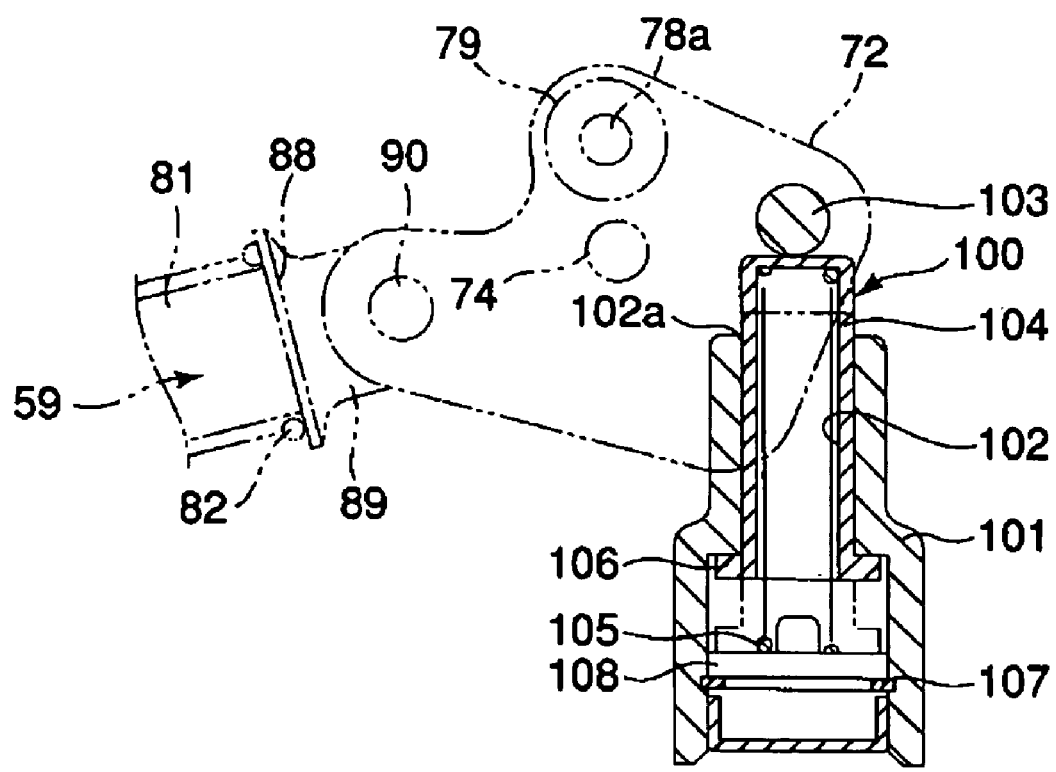
FIG. 14 is a cross-sectional view illustrating the positional relation between a canceling spring unit and a lock pin of the link plate of FIG. 13.

Therefore, in the clutch assist device 50 of this embodiment, a canceling spring unit 100 is incorporated in the case body 53 of the exterior case 51. As shown in FIG. 4 and FIG. 14, the case body 53 has a housing part 101 for housing the canceling spring unit 100. The housing part 101 is positioned at a lower part of the rear end of the case body 53 and is located on one side of the second wire introduction port 96.

As shown in FIG. 14, the housing part 101 has a cylinder 102 extending vertically. At the upper end of the cylinder 102 is formed an opening 102a opening into the exterior case 51. The opening 102a is opposed to a lock pin 103 secured to the link plate 72. The lock pin 103 is located at a position opposite the connecting end 89 where the link plate 72 is connected to the spring unit 59 with respect to the second pivot shaft 74.

As shown in FIG. 14, the canceling spring unit 100 has a pressing pin 104 and a canceling spring 105. The pressing pin 104 has a hollow shape with a closed upper end, and a flange-like stopper 106 is formed at the lower end of the pressing pin 104. The pressing pin 104 is slidably inserted into the cylinder 102 from below the housing part 101.

A spring receiver 108 is secured to the lower end of the housing part 101 via a circlip 107. The spring receiver 108 is located below the cylinder 102.

The canceling spring 105 preferably is a compression coil spring and is interposed between the upper inner surface of the pressing pin 104 and the spring receiver 108 in a compressed state. The canceling spring 105 constantly urges the pressing pin 104 upward. The urging force of the canceling spring 105 is set to a level slightly lower than that of the counter assist force caused by the auxiliary spring 82.

The pressing pin 104 is elastically movable between a first position where its upper end largely protrudes from the opening 102a of the cylinder 102 and a second position where its upper end slightly protrudes from the opening 102a of the cylinder 102. When the pressing pin 104 is in the first position, the stopper 106 of the pressing pin 104 abuts against the lower end of the cylinder 102 to restrict the position of the pressing pin 104. When the pressing pin 104 is in the second position, the stopper 106 of the pressing pin 104 abuts against the spring receiver 108 to restrict the position of the pressing pin 104.

While the clutch lever 9 is moved from the fully released position to the disengage start position, the upper end of the pressing pin 104 abuts against the lock pin 103 of the link plate 72 from below, as shown in FIG. 5 and FIG. 11. Therefore, the link plate 72 receives the urging force of the canceling spring 105 via the lock pin 103. As a result, the total of the urging force of the auxiliary spring 82 and the urging force of canceling spring 105 applied to the link plate 72 is almost zero and the link plate 72 is restricted from rotating in the clockwise direction when the clutch lever 9 is in the range of the free play.

Figure 13:
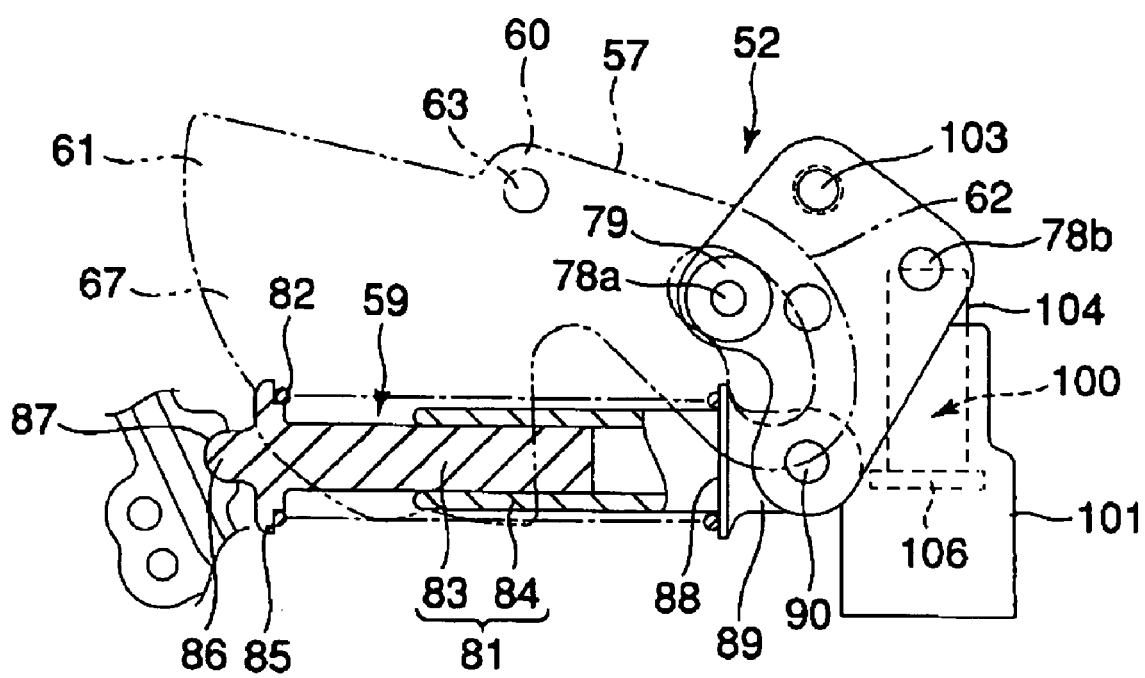
FIG. 13 is a side view, partially in cross-section, illustrating the positional relation among the link plate, the spring unit and the pressing pin at the time when the clutch operating lever is in the disengaged position in the first embodiment.

When the clutch lever 9 approaches the disengaged position from the disengage start position, the lock pin 103 of the link plate 72 is separated from the upper end of the pressing pin 104, as shown in FIG. 13. As a result, the pressing pin 104 is maintained in the first position by the urging force of the canceling spring 105, and the link plate 72 and the link lever 73 are forcibly rotated in the counterclockwise direction by the urging force of the auxiliary spring 82.

As shown in FIG. 3, FIG. 6 and FIG. 7, the case cover 54 of the exterior case 51 has a circular opening 110. The opening 110 is opposed to the wire connecting part 61 of the first rotatable member 57, and the engaging groove 68 and the engaging hole 69 of the wire connecting part 61 are exposed to the outside of the exterior case 51 through the opening 110. In other words, fingers or a tool can be inserted through the opening 110 to engage the inner wires 44 into the engaging groove 68 of the wire connecting part 61 or to engage the engaging elements 70 at the ends of the inner wires 44 into the engaging hole 69. Therefore, the inner wires 44 can be connected to the first rotatable member 57 with the case cover 54 secured to the case body 53.

The case cover 54 has a support wall 111 extending from the opening edge of the opening 10 to the center of the opening 110. The support wall 111 is located at a position which does not interfere with the wire connecting part 61 of the first rotatable member 57 and has a boss part 113 with a screw hole 112 at its end. The position of the screw hole 112 preferably coincides with the center of the opening 110.

The opening 110 is covered with a disk-like lid 114 (see FIG. 1). The lid 114 is removably fitted in the opening 110 and fixed to the support wall 111 by a bolt 115 (see FIG. 6). The bolt 115 extends through the center of the lid 114 and is threaded into the screw hole 112 of the boss part 113.

As shown in FIG. 3 and FIG. 9, the wire connecting part 61 of the first rotatable member 57 has a hexagonal insertion hole 118. The insertion hole 118 is located in the area of the opening 110, and is at a position which corresponds to a positioning recess 119 of the case body 53 when the clutch lever 9 is in the correct disengage start position. Therefore, by inserting a tool such as a hexagonal wrench into the insertion hole 118 through the opening 110 and engaging the tip of the tool into the recess 119, the first rotatable member 57 can be held in the position shown in FIG. 10.

Thus, the position of the first rotatable member 57 at the time when the clutch lever 9 is in the correct disengage start position can be determined, and, in this state, adjustment of the free play of the clutch wire 43 and connection of the inner wires 44 can be carried out.

According to this embodiment, the assist mechanism 52 installed at an intermediate point of the clutch wire 43 maintains the urging force of the auxiliary spring 82 applied to the clutch wire 43 via the first rotatable member 57 within a fixed range while the clutch lever 9 is moved from the midpoint between the disengage start position and the disengaged position to the disengaged position.

Therefore, the load applied from the clutch spring 27 to the push lever 40 of the clutch release mechanism 28 and the actual load applied to the clutch lever 9 thorough the assist mechanism 52 change with similar characteristics with respect to the wire stroke amount.

As a result, the clutch lever 9 can be prevented from becoming suddenly light when it gets close to the disengaged position in disengaging the frictional clutch 18 although the urging force of the auxiliary spring 82 is applied to the clutch wire 43. Thus, the force necessary to operate the clutch lever 9 is reduced, and the clutch lever 9 can be operated with the same operating feel as in operating a conventional clutch lever. The operation of the clutch lever 9 does not cause any uncomfortable feeling, and the operability of the clutch lever 9 can be improved.

In addition, according to this embodiment, the first clutch wire 43a and the second clutch wire 43b are moved with a one-to-one relationship between them being maintained. Therefore, the assist mechanism 52 can be installed in the length of clutch cable, through which the motion of the clutch lever 9 is transmitted to the push lever 40, without changing the construction of the friction clutch 18.

Furthermore, the assist mechanism 52 of this embodiment has the canceling spring unit 100, which abuts against the lock pin 103 of the link plate 72 from below when the clutch operating lever 9 is in the fuilly released position. The canceling spring 105 of the canceling spring unit 100 acts to cancel the counter assist force caused by the auxiliary spring 82 and prevents the rotation of the link plate 72 in such a direction as to engage the friction clutch 18 based on the counter assist force. Therefore, the initial input load necessary to squeeze the clutch lever 9 first is not increased to ease the operation and feel of the clutch lever 9.

Second Embodiment

In the second embodiment, the clutch assist device 50 according to the first embodiment is modified as shown in FIG. 16 to FIG. 25. The clutch assist device 50 of the first embodiment is further decreased in size in accordance with the second embodiment of a clutch assist device. In the following description, those parts corresponding to the components of the first embodiments are identified with the same reference numerals.

Figure 16:
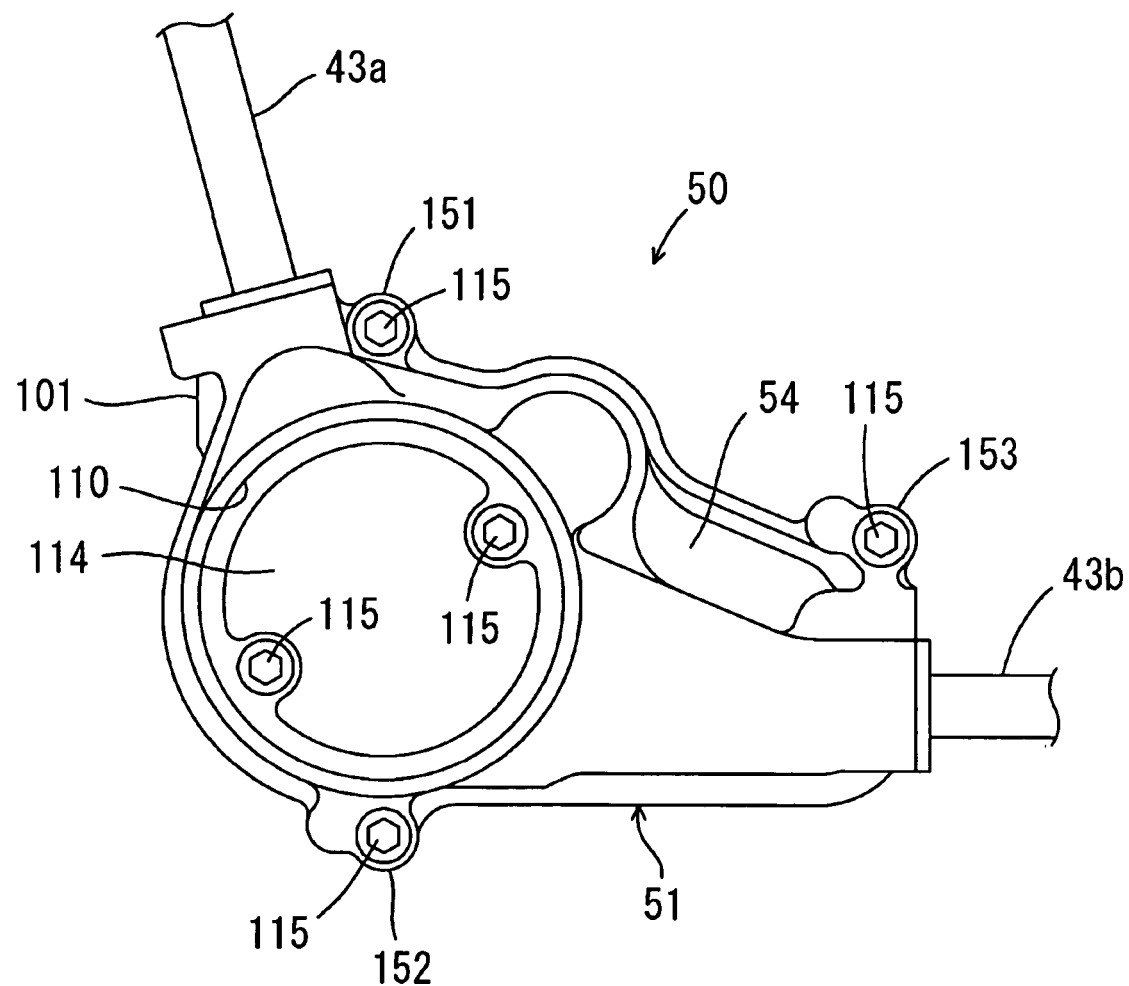
FIG. 16 is a side view of a clutch assist device configured in accordance with a second embodiment of the present invention.
Figure 17:
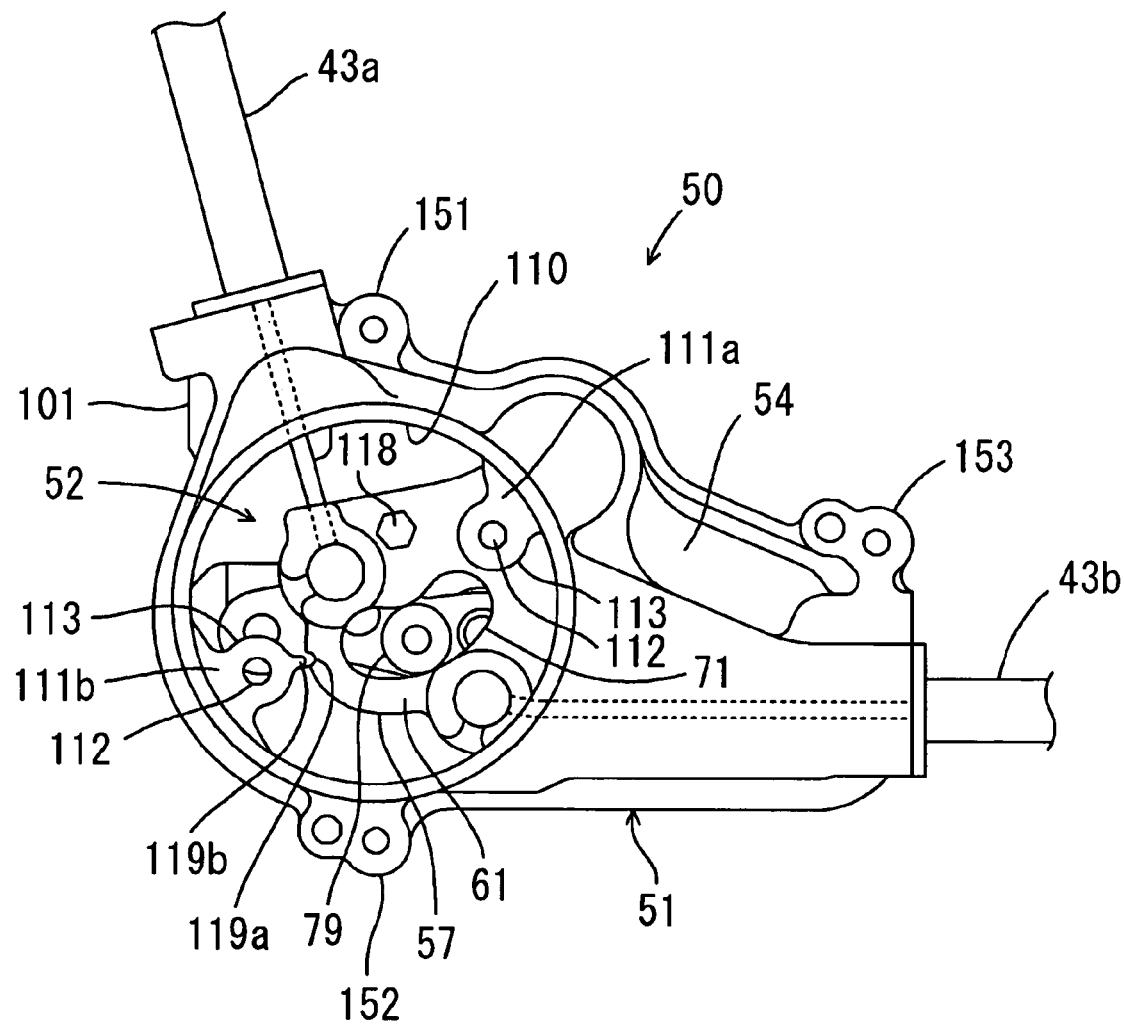
FIG. 17 is a side view illustrating the state in which a lid of the clutch assist device according to the second embodiment has been removed.
Figure 18:
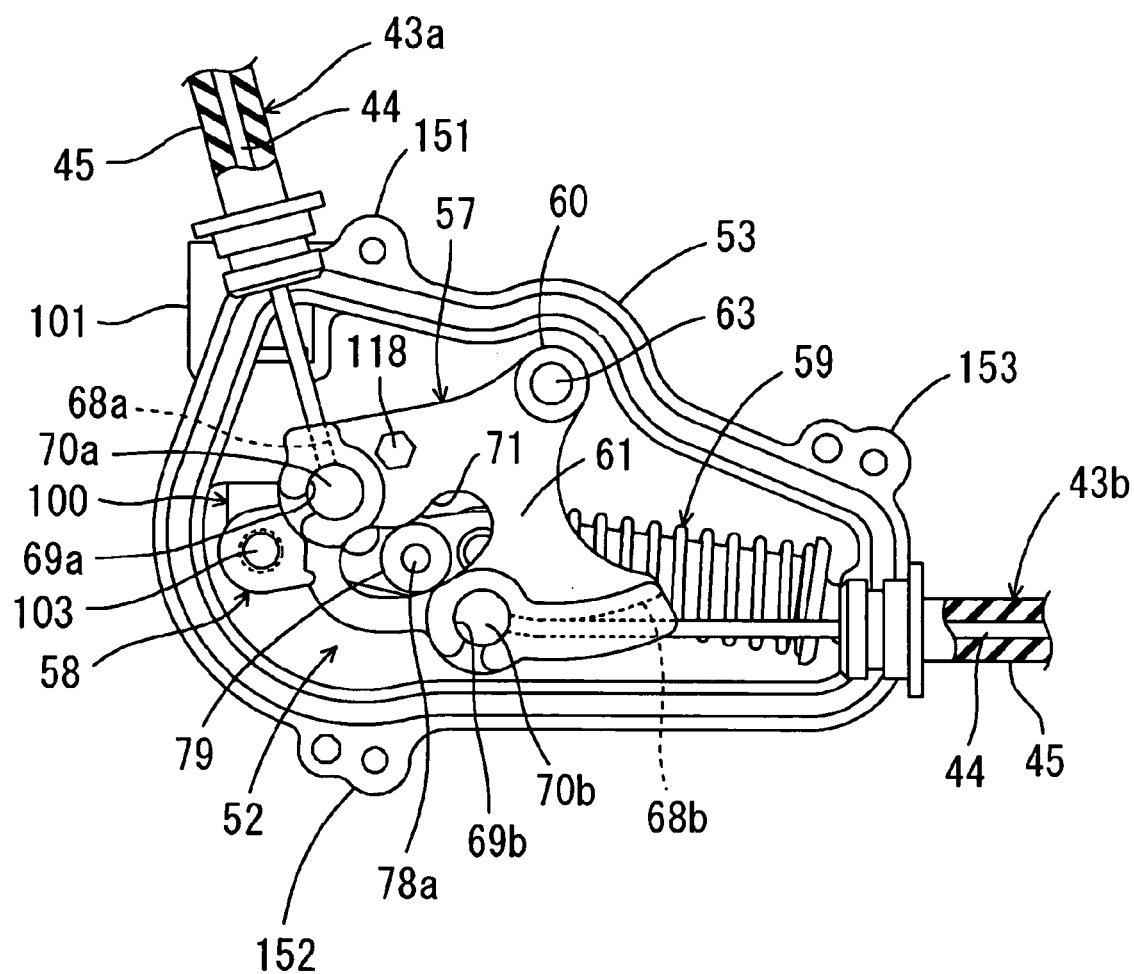
FIG. 18 is a side view of the clutch assist device of the second embodiment, illustrating the state of the assist mechanism at the time when the clutch operating lever is in a disengage start position.

As shown in FIG. 16 to FIG. 18, the second embodiment of the clutch assist device 50 also preferably has an exterior case 51 and an assist mechanism 52. The exterior case 51 has a case body 53 and a case cover 54. In the second embodiment, the areas of the case body 53 and the case cover 54 as viewed from a side are smaller than those in the first embodiment.

As shown in FIG. 16 and FIG. 18, each of the case body 53 and the case cover 54 has first, second and third fastening parts 151, 152 and 153, each having a bolt hole. The case body 53 and the case cover 54 are secured to each other at the fastening parts 151, 152 and 153 by bolts 115.

As shown in FIG. 18, the assist mechanism 52 has a first rotatable member 57, a second rotatable member 58, a spring unit 59, and a canceling spring unit 100.

The first rotatable member 57 has a pivot part 60 and a wire connecting part 61. As shown in FIG. 4, the first rotatable member 57 of the first embodiment has a lever part 62 having the cam groove 71 in addition to the wire connecting part 61. The rotatable member 57 of the second embodiment, however, does not have the lever part 62 and the wire connecting part 61 has a cam groove 71, as shown in FIG. 18. In this embodiment, since the lever part 62 is omitted, the area of the first rotatable member 57 is smaller. The first rotatable member 57 is generally in the form of a sector with a central angle of smaller than 120° as viewed along the axial direction of the first pivot shaft 63. The shape of the first rotatable member 57 is not specifically limited, though. The first rotatable member 57 may have other shape as well, such as, for example, be triangular. The first rotatable member 57 may be made even smaller in size in some applications. For example, the first rotatable member 57, in the illustrated embodiment, is generally in the form of a sector with a central angle of less than 90°.

Figure 24:
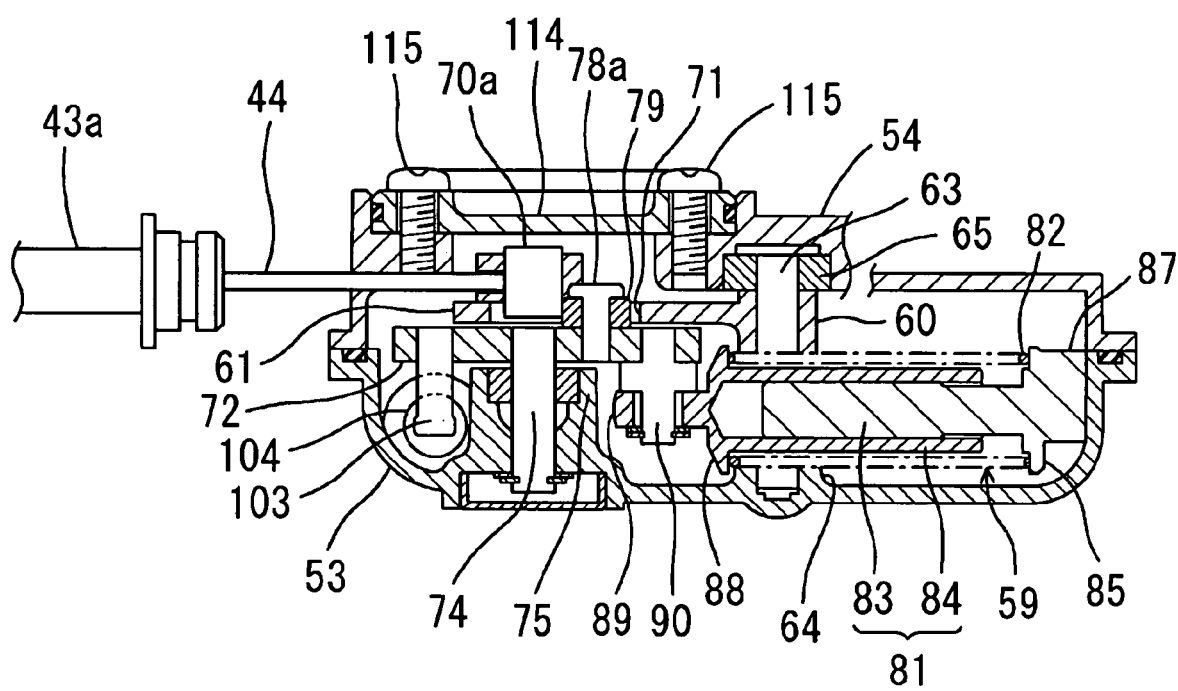
FIG. 24 is a cross-sectional view of the clutch assist device according to the second embodiment.

As shown in FIG. 24, the pivot part 60 is rotatably supported by a boss part 64 of the case body 53 via the first pivot shaft 63. The end of the first pivot shaft 63 opposite the boss part 64 is supported by a bearing part 65 of the case cover 54.

Figure 25:
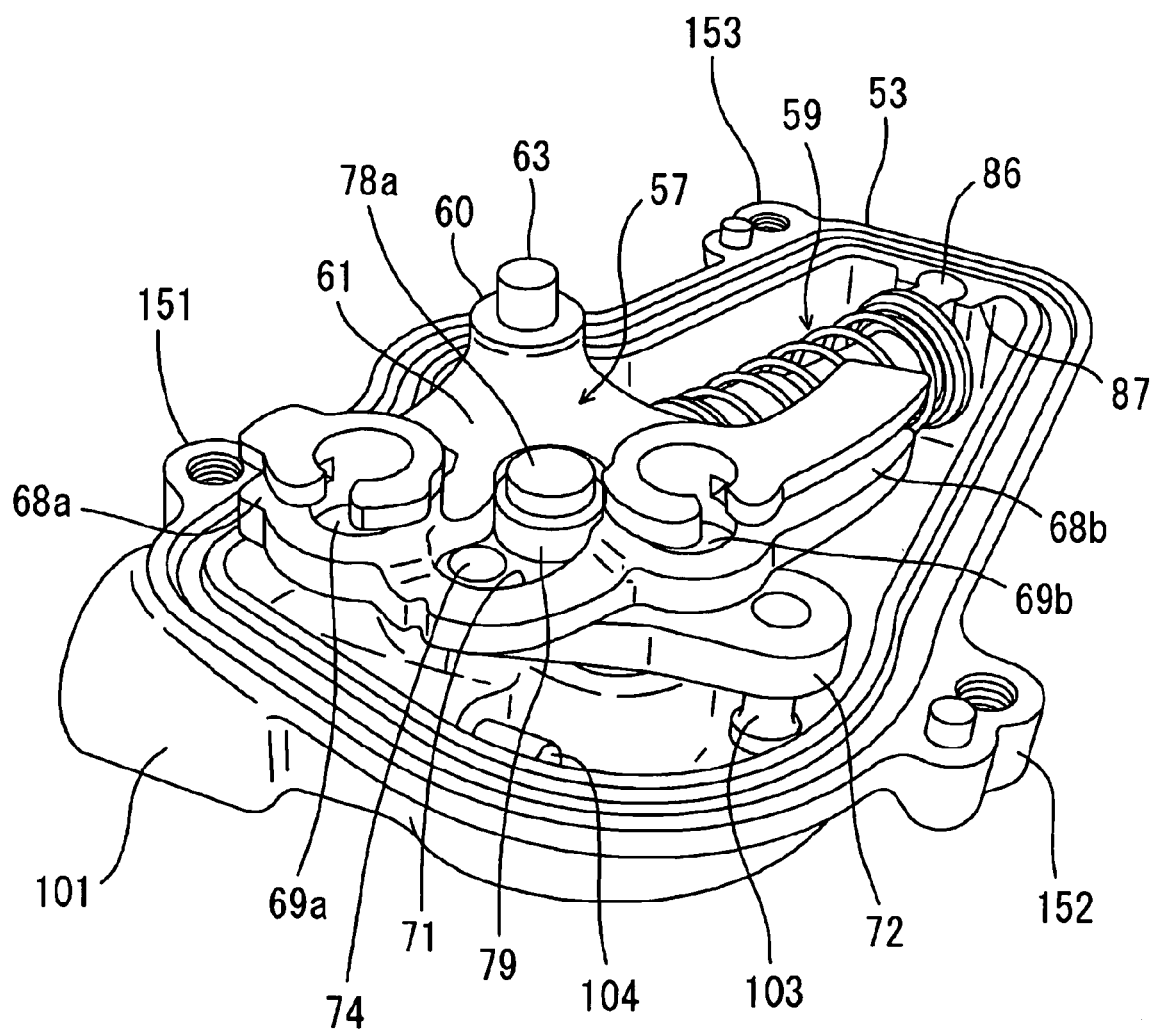
FIG. 25 is a perspective view of the clutch assist device according to the second embodiment.

As shown in FIG. 18 and FIG. 25, the wire connecting part 61 has a first engaging groove 68a and a first engaging hole 69a at one end of its lower edge. The wire connecting part 61 has a second engaging groove 68b and a second engaging hole 69b at the other end of its lower edge.

The inner wire 44 of the first clutch wire 43a is received in the first engaging groove 68a. The first engaging grooves 68a opens at the outer peripheral surface of the lower edge. The first engaging hole 69a is of a circular shape. The first engaging hole 69a opens at the outer peripheral surface of the lower edge and in the first engaging groove 68a. An engaging element 70a with a cylindrical shape is attached to an end of the inner wire 44 of the first clutch wire 43a. The engaging element 70a is engaged with the opening edge of the first engaging hole 69a. The inner wire 44 of the first clutch wire 43a is thereby engaged with the wire connecting part 61.

The inner wire 44 of the second clutch wire 43b is received in the second engaging groove 68b. The second engaging grooves 68b opens at the outer peripheral surface of the lower edge. The second engaging hole 69b is also of a circular shape. The second engaging hole 69b opens at the outer peripheral surface of the lower edge and in the second engaging groove 68b. An engaging element 70b with a cylindrical shape secured to an end of the inner wire 44 of the second clutch wire 43b is engaged with the opening edge of the second engaging hole 69b. The inner wire 44 of the second clutch wire 43b is thereby engaged with the wire connecting part 61.

The first engaging groove 68a and the second engaging groove 68b are each curved in an arc around the first pivot shaft 63. The inner wire 44 of the first clutch wire 43a and the inner wire 44 of the second clutch wire 43b are integrally connected to each other via the first rotatable member 57. Therefore, the inner wire 44 of the first clutch wire 43a and the inner wire 44 of the second clutch wire 43b can move together at the same displacement rate. Since the distance from the first pivot shaft 63 to the engaging element 70a and the distance from the first pivot shaft 63 to the engaging element 70b are equal, the inner wires 44 can move through the same distance.

The cam groove 71 is located between the first engaging hole 69a and the second engaging hole 69b. The cam groove 71 is a curved slot which is concave toward the first engaging hole 69a.

Figure 19:
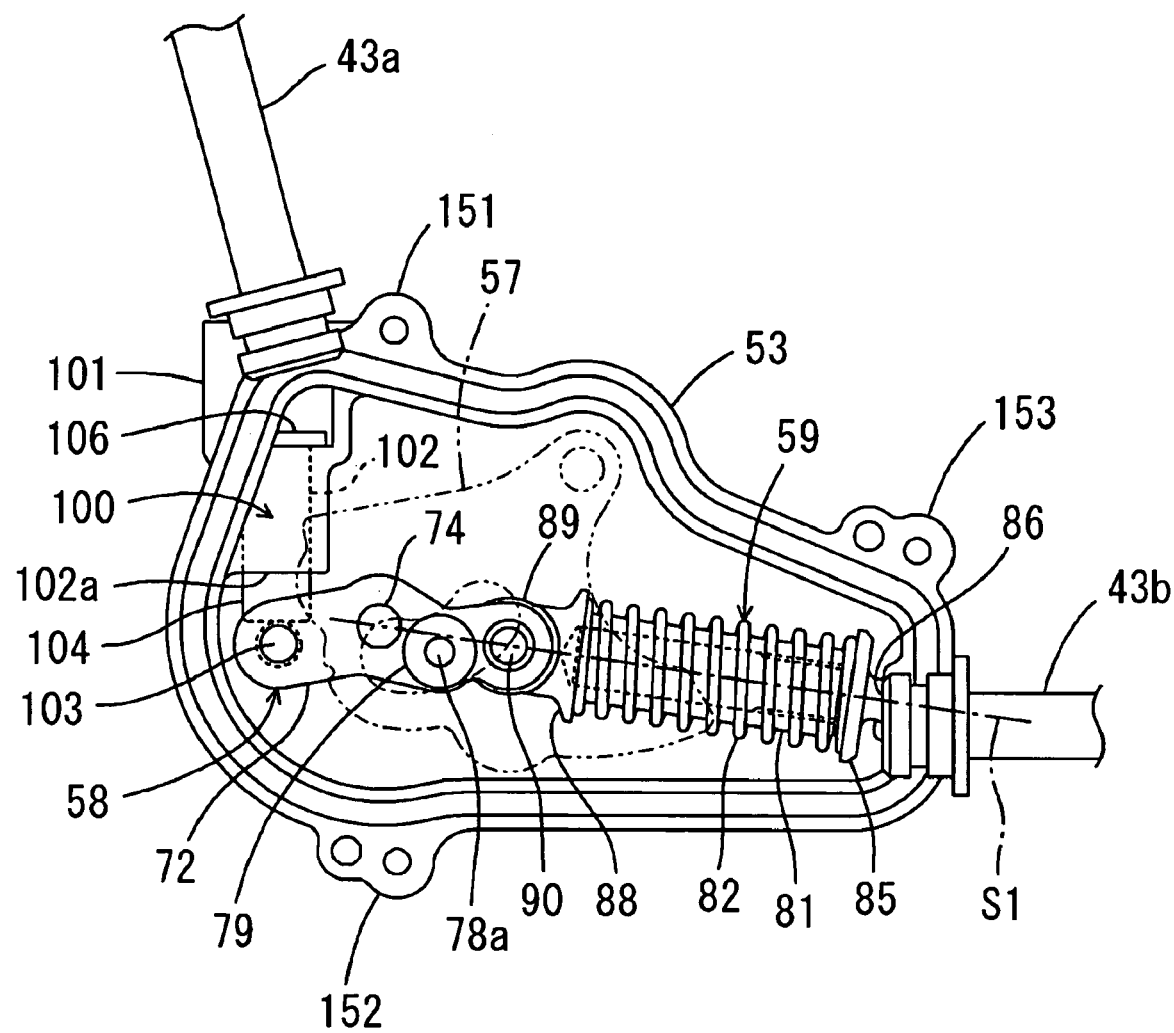
FIG. 19 is a side view of the clutch assist device of the second embodiment, illustrating the state of a part of the assist mechanism at the time when the clutch operating lever is in a disengage start position.

The second rotatable member 58 of the first embodiment has a link plate 72 and a link lever 73 (see FIG. 4). However, in this embodiment, the second rotatable member 58 is comprised of only a link plate 72 as shown in FIG. 19. The link plate 72 is located on the reverse side of the first rotatable member 57. The link plate 72 is rotatably supported by a boss part 75 (see FIG. 24) of the case body 53 via a second pivot shaft 74.

A first pin 78a, which extends to the front side of the first rotatable member 57, is joined to the link plate 72. A cam follower 79, such as a roller, is rotatably supported by the first pin 78a. The cam follower 79 is located in the cam groove 71 and in contact with the inner surface of the cam groove 71.

Therefore, the cam groove 71 and the cam follower 79 can transmit a force from the first rotatable member 57 to the second rotatable member 58 or from the second rotatable member 58 to the first rotatable member 57 when the first rotatable member 57 or the second rotatable member 58 rotates. The cam groove 71 and the cam follower 79 comprise a cam mechanism.

Figure 21:
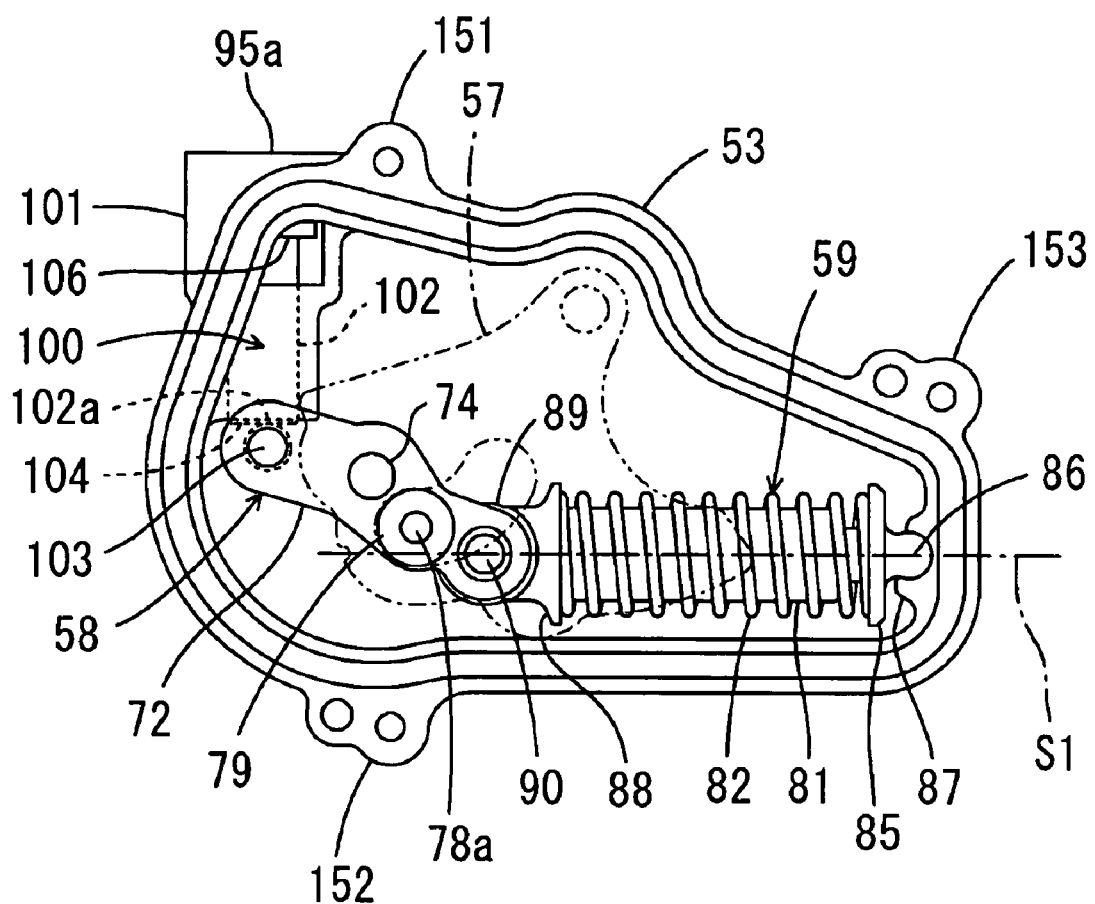
FIG. 21 is a side view of the clutch assist device of the second embodiment, illustrating the state of a part of the assist mechanism at the time when the clutch operating lever is fully released.
Figure 22:
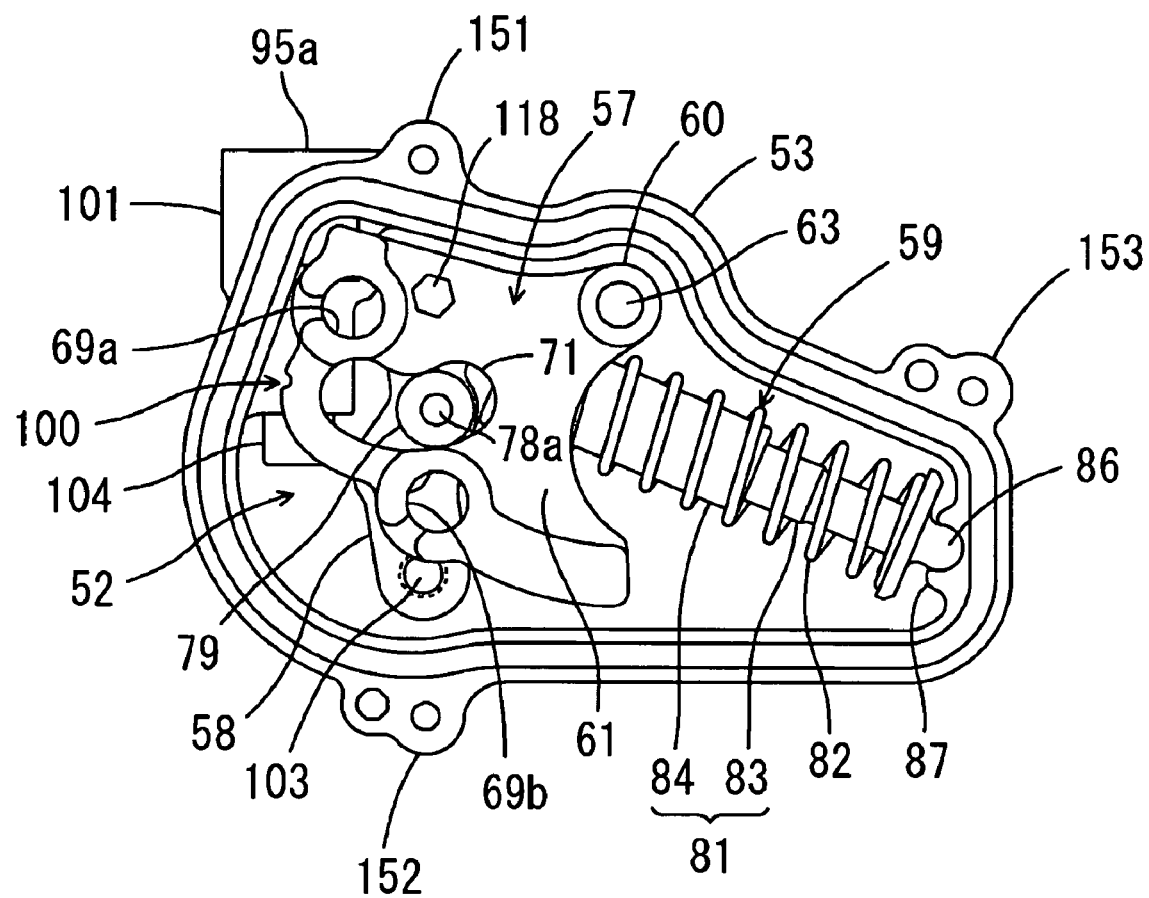
FIG. 22 is a side view of the clutch assist device of the second first embodiment, illustrating the state of the assist mechanism at the time when the clutch operating lever is in a disengaged position.

The construction of the spring unit 59 is the same as that of the first embodiment. However, the spring unit 59 is attached at a different position and in a different posture in this embodiment. As shown in FIG. 21, the mounting seat 87 for supporting the pivot end 86 of the spring unit 59 is disposed at a rear end (at a right-hand end in FIG. 21) in the case body 53 in this embodiment. The spring unit 59 extends forward or obliquely forward from a rear end in the case body 53 (see FIG. 23).

As shown in FIG. 19, the connecting end 89 of the spring unit 59 is rotatably connected to the link plate 72 of the second rotatable member 58 via a pin 90. When the clutch lever 9 is in the disengage start position (in the state shown in FIG. 19), the pivot end 86 and the connecting end 89 of the spring holder 81 and the second pivot shaft 74 as the center of rotation of the second rotatable member 58 are positioned on a straight line S1.

Figure 20:
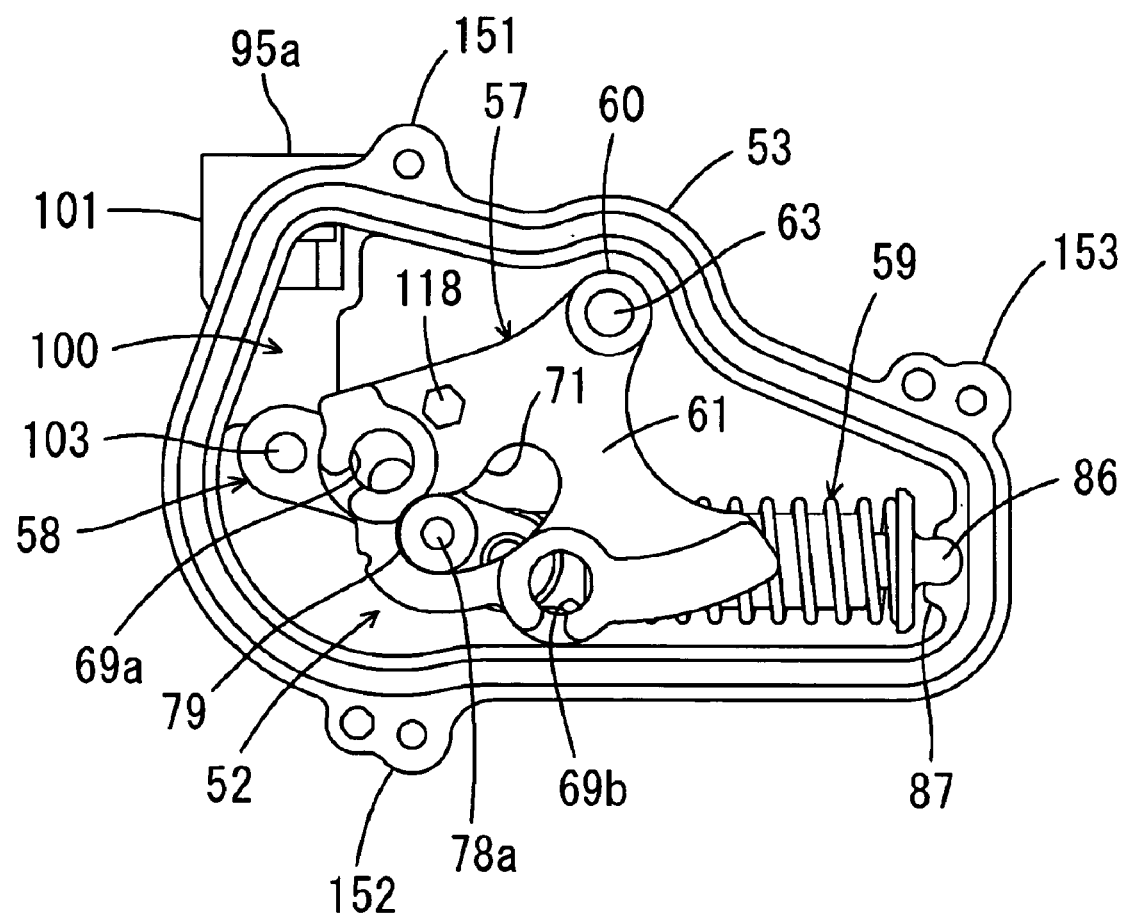
FIG. 20 is a side view of the clutch assist device of the second embodiment, illustrating the state of an assist mechanism at the time when the clutch operating lever is fully released.

FIG. 20 and FIG. 21 show the state of the assist mechanism 52 at the time when the clutch lever 9 is in the fully released position. When the clutch lever 9 is in the fully released position, the second pivot shaft 74 of the link plate 72 is positioned above the straight line S1 connecting the pivot end 86 and the connecting end 89 of the spring holder 81, as shown in FIG. 21. The cam follower 79 is positioned at the left end of the cam groove 71.

When the rider moves the clutch lever 9 from the fully released position toward the disengage start position, the first rotatable member 57 is pulled upward via the first clutch wire 43a and is rotated in the clockwise direction about the first pivot shaft 63. The rotation of the first rotatable member 57 causes the cam groove 71 to rotate (also in the clockwise direction) about the pivot shaft 63 and to move upward. Therefore, the cam follower 79 in contact with the cam groove 71 receives a force which urges it upward, and the link plate 72 is rotated in the counterclockwise direction about the second pivot shaft 74. As a result, the spring unit 59 is rotated in the clockwise direction about the pivot end 86.

When the clutch lever 9 reaches the disengage start position, the second pivot shaft 74 is positioned on the straight line S1 connecting the pivot end 86 and the connecting end 89 of the spring holder 81, as shown in FIG. 19. Therefore, the urging force of the auxiliary spring 82 does not act to rotate the link plate 72 at this position.

When the clutch lever 9 is moved from the disengage start position toward the disengaged position, the first rotatable member 57 is further rotated in the clockwise direction. The rotation of the first rotatable member 57 causes the cam groove 71 to rotate further about the pivot shaft 63 and move upward. At this time, the cam groove 71 is brought to a generally horizontal position. As a result, the cam follower 79 in contact with the cam groove 71 receives a force which urges it toward the top or front of the case body 53, and the link plate 72 is further rotated in the counterclockwise direction.

When the clutch lever 9 is moved from the disengage start position to the disengaged position, the spring unit 59 is further rotated in the clockwise direction about the pivot end 86. Then, the straight line SI (connecting the pivot end 86 and the connecting end 89 of the spring unit 59) is offset upward from the center of rotation of the link plate 72 (pivot shaft 74). Therefore, the spring holder 81 receiving the urging force of the auxiliary spring 82 expands, and the urging force of the auxiliary spring 82 is transmitted to the link plate 72 and acts as a force to rotate the link plate 72 in the counterclockwise direction. Thus, when the clutch lever 9 is moved toward the disengaged position from the disengage start position, the link plate 72 is forcibly rotated in the counterclockwise direction by the auxiliary spring 82. The urging force of the auxiliary spring 82 is added to the operating force the rider applies to squeeze the clutch lever 9, and the load on the rider in operating the clutch lever 9 is reduced.

Also in this embodiment, the cam groove 71 determines the timing at which the link plate 72 receives an urging force from the spring unit 59 and starts moving in the counterclockwise direction. The cam groove 71 is of such a shape as to change the angular velocity ratio, which is the ratio of the angular velocity of the second rotatable member 58 to the angular velocity of the first rotatable member 57, while the clutch lever 9 is moved from the disengage start position to the disengaged position. The cam groove 71 is of such a shape that the urging force of the auxiliary spring 82 transmitted to the first rotatable member 57 via the link plate 72 (more specifically, the moment which rotates the first rotatable member 57 in the clockwise direction) can increase more rapidly than in a conventional device in the initial stage of the process where the clutch lever 9 is moved from the disengage start position to the midpoint.

Figure 34:
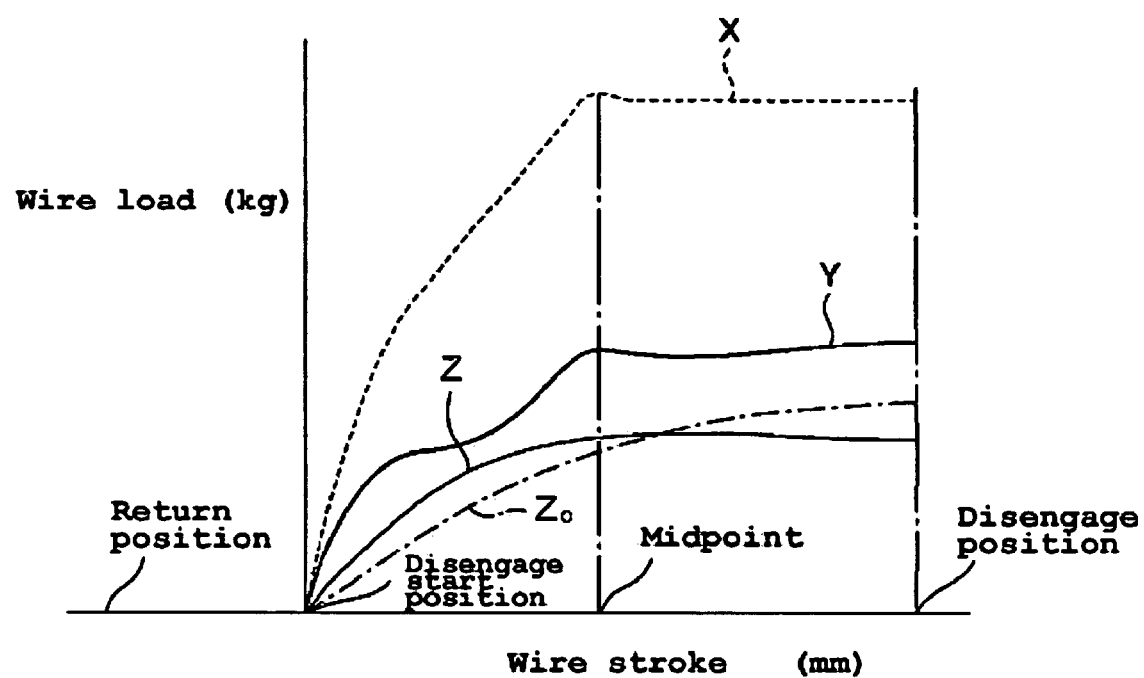
FIG. 34 is a graph showing the changes of the loads applied to a push lever and a clutch operating lever when the clutch operating lever is moved (e.g., squeezed), as a result of the clutch assist device of the second embodiment, so as to disengage the friction clutch.

FIG. 34 contrastively shows the variation characteristics of the urging force Z of the auxiliary spring 82 and the variation characteristics of the urging force $Z_O$ in a conventional device. The gradient at the rising section of the characteristic curve of the urging force Z in this assist mechanism 52 is greater than that in a conventional device.

Here, the conventional device is a device in which a rotatable member connected to a clutch release mechanism is directly connected to an auxiliary spring and in which the rotatable member and the auxiliary spring rotate at the same speed and the auxiliary spring can freely expand as the rotatable member rotates (for example, the device disclosed in the U.S. Pat. No. 5,495,928).

In this assist mechanism 52, the ratio of the angular velocity of the second rotatable member 58 to the angular velocity of the first rotatable member 57 is greater when the clutch lever 9 is in the disengage start position than when the clutch lever 9 is in the disengaged position. Also, the average of the angular velocity ratio at the time when the clutch lever 9 is moved from the disengage start position to the midpoint is greater than the average of the angular velocity ratio at the time when the clutch lever 9 is moved from the midpoint to the disengaged position. The angular velocity ratio may be gradually smaller while the clutch lever 9 is moved from the disconnect start position to the disengaged position. By properly adjusting the angular velocity ratio, the variation characteristics of the urging force Z of the auxiliary spring 82 transmitted to the first rotational member 57, that is, the variation characteristics of the assist force which the clutch lever 9 receives, can be advantageously set.

As described above, by properly setting the shape of the cam groove 71, the variation characteristics of the assist force can be freely adjusted. As shown in FIG. 34, the load X applied to the push lever 40 of the frictional clutch 18 varies greatly, immediately after the clutch lever 9 has passed the disengage start position, and the degree of change is smaller after that. With this assist mechanism 52, the gradient of the rising section of the characteristic curve of the urging force Z can be large so that the load Y applied to the clutch lever 9 can be changed with characteristics almost the same as those of the load X applied to the push lever 40 of the friction clutch 18 while the clutch lever 9 is moved from the disconnect start position to the midpoint. That is, the ratio between the load Y applied to the clutch lever 9 and the load X applied to the push lever 40 can be within a fixed range. It is, therefore, possible to reduce the load necessary to operate the clutch lever 9 and to provide the same operating feel as a conventional clutch lever at half-clutch operation.

As described in the description of the first embodiment, the assist force applied to the first rotatable member 57 is maintained within a fixed range when the clutch lever 9 is moved from the midpoint to the disengaged position. That is, the cam groove 71 is of such a shape as to maintain the urging force of the auxiliary spring 82 applied to the first rotatable member 57 via the link plate 72 within a fixed range when the clutch lever 9 is moved from the midpoint toward the disengaged position.

In this embodiment, the housing part 101 housing the canceling spring unit 100 is disposed at an upper front end of the case body 53 of the exterior case 51 as shown in FIG. 19. The housing part 101 is aligned with the first wire introduction port 95a in the transverse direction (in a direction perpendicular to the plane of FIG. 19). The internal structure of the canceling spring unit 100 is the same as that of the canceling spring unit 100 of the first embodiment.

Figure 23:
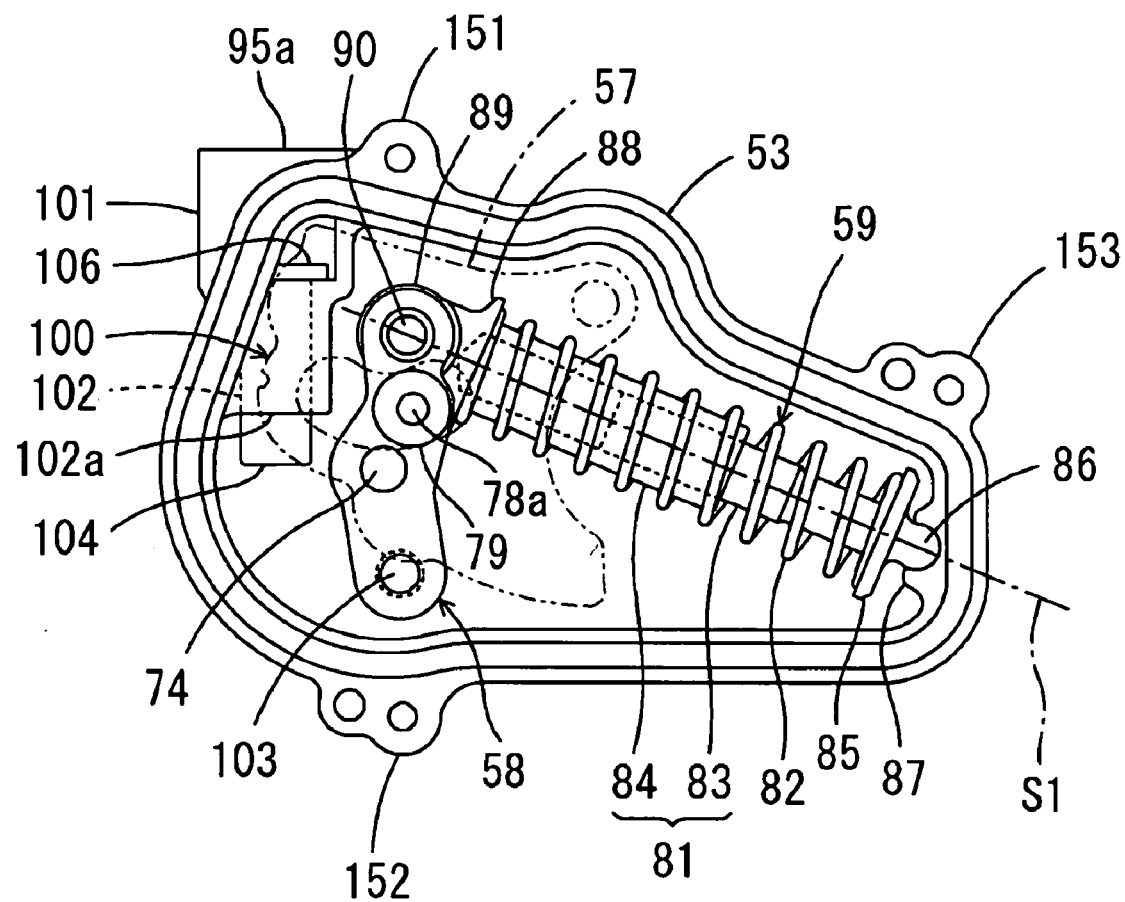
FIG. 23 is a side view of the clutch assist device of the second embodiment, illustrating the state of a part of the assist mechanism at the time when the clutch lever is in the disengaged position.

As shown in FIG. 23, the opening 102*a* of the cylinder 102 of the canceling spring unit 100 opens downward. The pressing pin 104 is elastically movable between a first position where its lower end largely protrudes from the opening 102*a* of the cylinder 102 and a second position where its lower end slightly protrudes from the opening 102*a* of the cylinder 102. When the pressing pin 104 is in the first position, the stopper 106 of the pressing pin 104 abuts against the upper end of the cylinder 102 to restrict the position of the pressing pin 104. When the pressing pin 104 is in the second position, the stopper 106 of the pressing pin 104 abuts against the spring receiver (not shown) to restrict the position of the pressing pin 104.

While the clutch lever 9 is moved from the return position (see FIG. 21) to the disengage start position (see FIG. 19), the pressing pin 104 abuts against the lock pin 103 of the link plate 72 from above. Thus, the link plate 72 receives the urging force of the canceling spring 105 (not shown in FIG. 21, but see FIG. 14) via the lock pin 103. As a result, when the clutch lever 9 is in the range of free play, the urging force of the auxiliary spring 82 applied to the link plate 72 is cancelled by the urging force of the canceling spring 105. Therefore, the force applied to the link plate 72 is substantially zero and the rotation of the link plate 72 in the clockwise direction caused by the auxiliary spring 82 (and thus the return of the clutch lever 9) is restricted.

When the clutch lever 9 gets close to the disengaged position over the disengage start position, the lock pin 103 of the link plate 72 is separated from the lower end of the pressing pin 104, as shown in FIG. 23. As a result, the pressing pin 104 is held in the first position by the urging force of the canceling spring 105, and the link plate 72 receives a force which urges it to rotate in the counterclockwise direction from the auxiliary spring 82.

As shown in FIG. 17, the case cover 54 of the exterior case 51 has a circular opening 110. The opening 110 is opposed to the wire connecting part 61 of the first rotatable member 57, and the engaging grooves 68*a* and 68*b* and the engaging holes 69*a* and 69*b* of the wire connecting part 61 are exposed to the outside of the exterior case 51 through the opening 110. In other words, fingers or a tool can be inserted through the opening 110 to engage the inner wires 44 into the engaging grooves 68*a* and 68*b* of the wire connecting part 61 or to engage the engaging elements 70*a* and 70*b* at the ends of the inner wires 44 into the engaging holes 69*a* and 69*b*. Therefore, the inner wires 44 can be connected to the first rotatable member 57 with the case cover 54 secured to the case body 53.

The case cover 54 has first and second support walls 111*a* and 111*b* extending from the edge of the opening 110 toward the center of the opening 110. The first support wall 111*a* and the second support wall 111*b* are located at opposite positions with respect to the center of the opening 110. Each of the first and second support walls 111*a* and 111*b* has a boss part 113 with a screw hole 112 at its end.

As shown in FIG. 16, the opening 110 is covered with a disk-like lid 114. The lid 114 is removably attached to the opening 110 and is secured to the support walls 111*a*, 111*b* by bolts 115. The bolts 115 are threaded into the screw holes 112 of the boss parts 113 of the support walls 111*a*, 111*b*.

As shown in FIG. 17, the wire connecting part 61 of the first rotatable member 57 has a hexagonal insertion hole 118. The insertion hole 118 is located in the area of the opening 110. Therefore, when a tool such as a hexagonal wrench is inserted from the opening 110 into the insertion hole 118, the position of the first rotatably member 57 can be adjusted. The wire connecting part 61 of the first rotatable member 57 has a positioning recess 119*a*. The second support wall 111*b* of the case cover 54 has a positioning projection 119*b*. The projection 119*b* and the recess 119*a* align with each other when the clutch lever 9 is in the proper disengage start position. Therefore, by adjusting the amount of free play of the clutch lever 9 so that the projection 119*a* and the recess 119*b* can align with each other, the disengage start position can be easily set.

The method of attaching the clutch assist device 50 to the frame 2 of the motorcycle 1 and an example of the mounting structure thereof are next described. The clutch assist device 50 described below is the same as the clutch assist device 50 described above except that the position of the third fastening part 153 is changed from on an upper part of the case body 53 to on a lower part of the case body 53 (see FIG. 26). The other construction is the same as that as described above.

Figure 32:
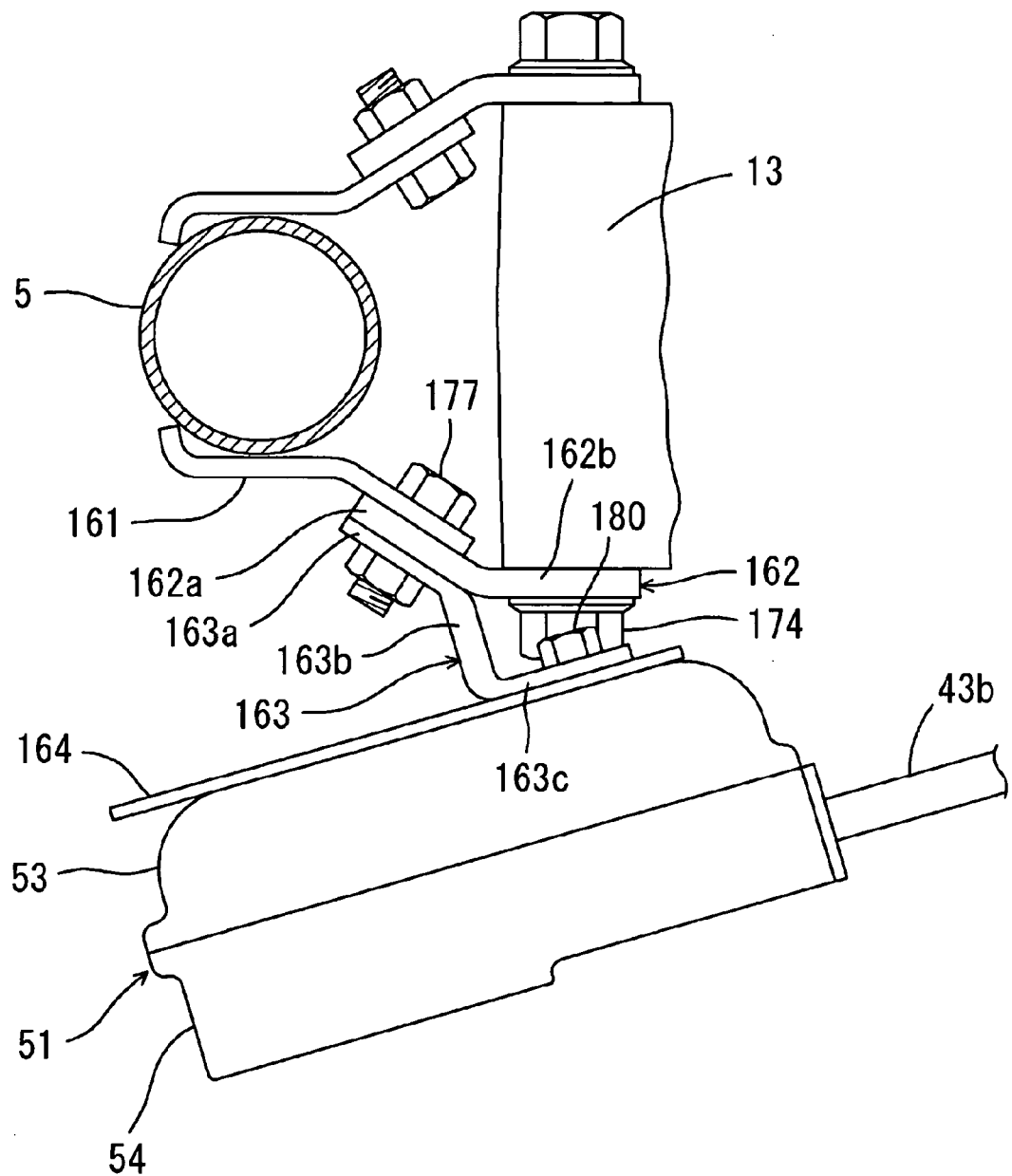
FIG. 32 is a top plan view illustrating the installation state of the operating assisting device of FIG. 31.

As shown in FIG. 32, the clutch assist device 50 preferably is attached to the down tube 5 of the frame 2 via a first bracket 161, a second bracket 162, a third bracket 163 and a mounting plate 164. Of course, other locations of the clutch assist device 50 on the vehicle are also possible, depending upon the type of vehicle and application.

Figure 27:
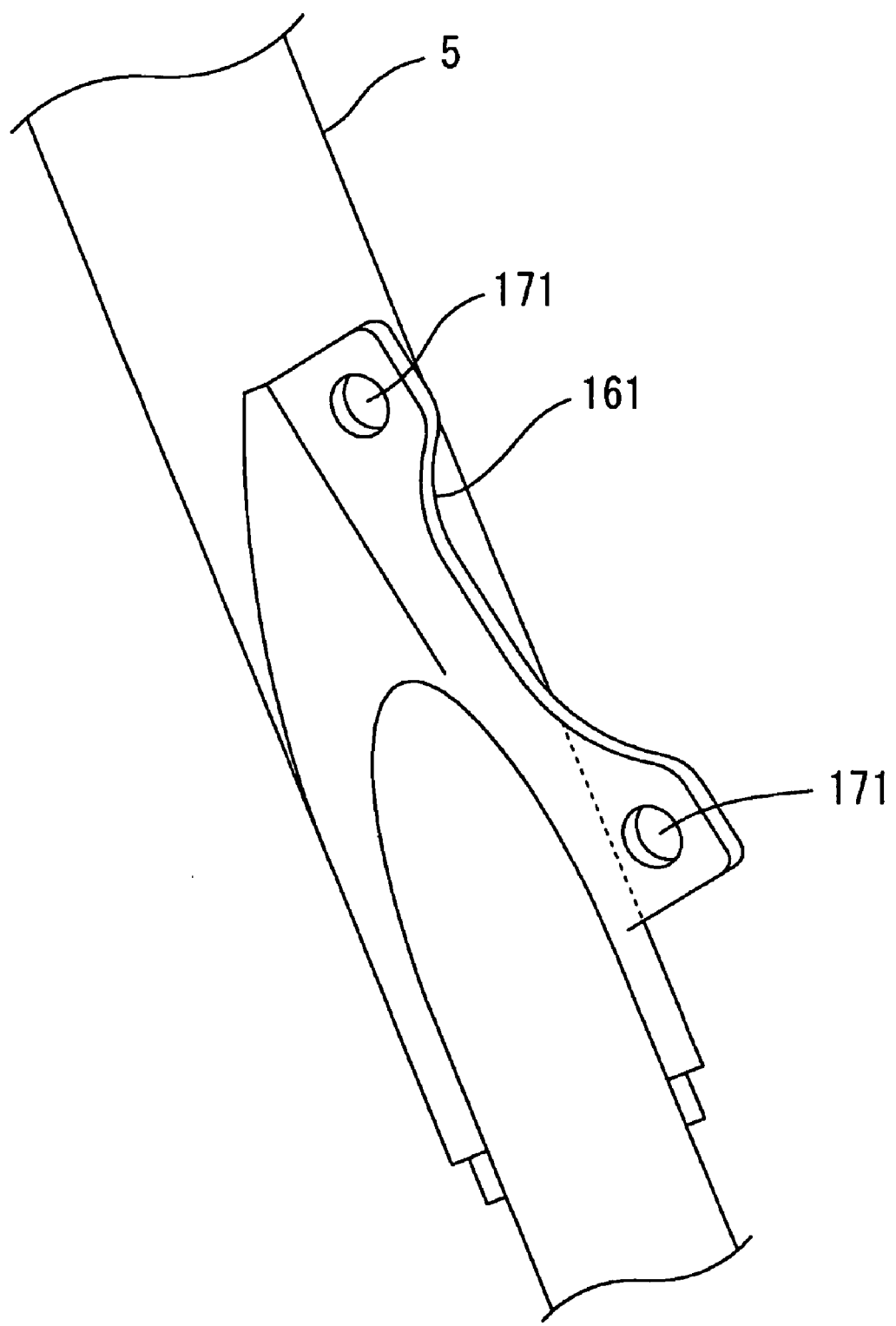
FIG. 27 is a side view illustrating the installation state of a first bracket.

As shown in FIG. 27, in the illustrated embodiment, the first bracket 161 is secured to the down tube 5. The method for securing the first bracket 161 is not specifically limited. Here, the first bracket 161 is joined to the down tube 5 by welding. The first bracket 161 is, as in the case with the second bracket 162, originally attached to the down tube 5 to support a part of the engine 13. That is, the clutch assist device 50 is attached using the existing brackets 161 and 162. The first bracket 161 extends along the longitudinal direction of the down tube 5. The first bracket 161 has bolt holes 171 at its longitudinal ends.

Figure 28:
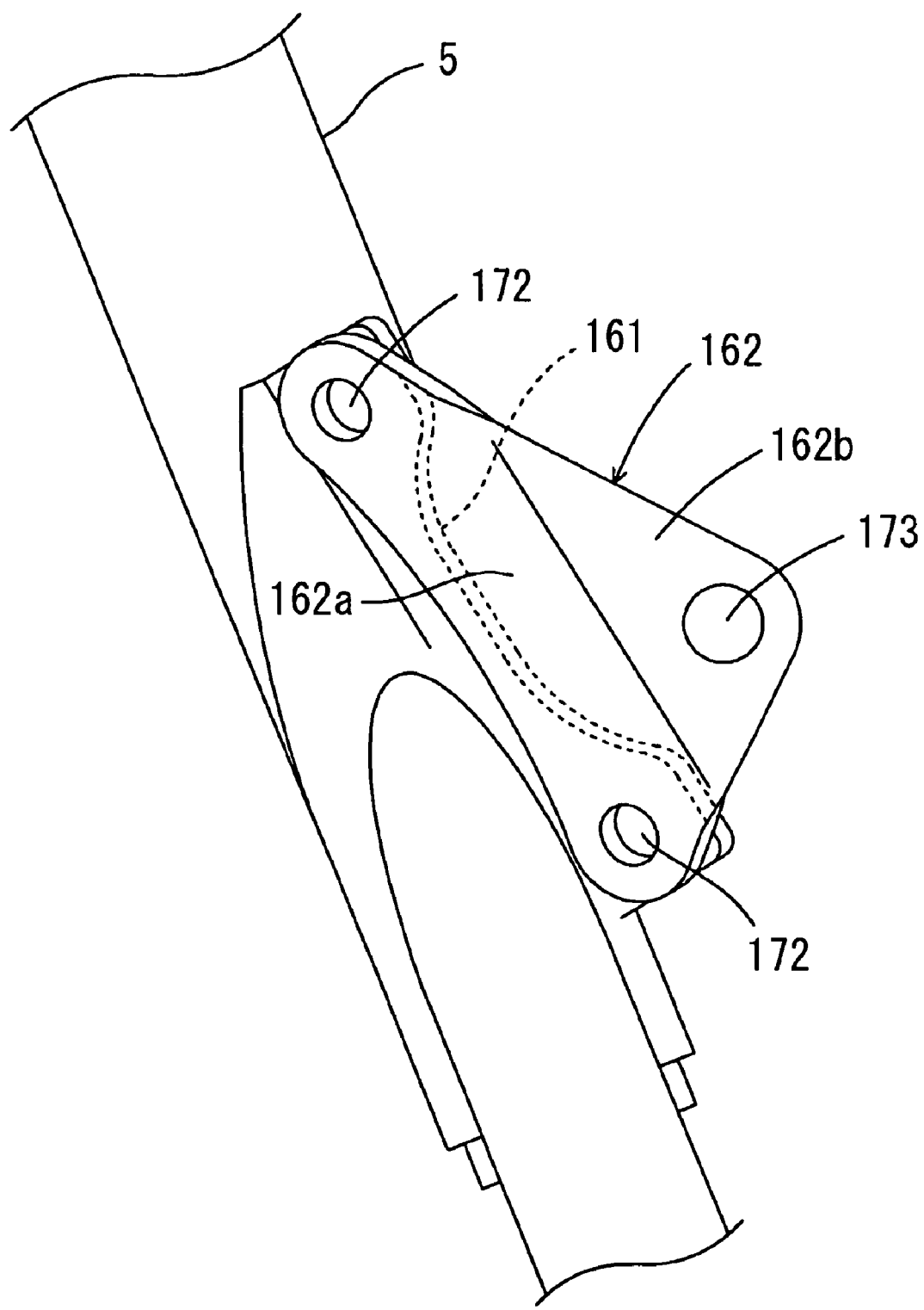
FIG. 28 is a side view illustrating the installation state of a second bracket.

As shown in FIG. 28, the second bracket 162 is laid on the front side of the first bracket 161. The second bracket 162 is a bent plate member with a generally triangle shape as viewed from a side. The second bracket 162 has a front half part 162*a*, which extends in a direction inclined from the longitudinal direction of the vehicle along the first bracket 161, and a rear half part 162*b*, which is located behind the front half part 162*a* and is bent inward (see FIG. 32). The front half part 162*a* of the second bracket 162 has bolt holes 172 at positions corresponding to the bolt holes 171 of the first bracket 161. The rear half part of the second bracket 162 also has a bolt hole 173. As shown in FIG. 32, a bolt 174 for fixing a part of the engine 13 is fitted into the bolt hole 173. The part of the engine 13 is supported by the down tube 5 via the first bracket 161 and the second bracket 162.

Figure 29:
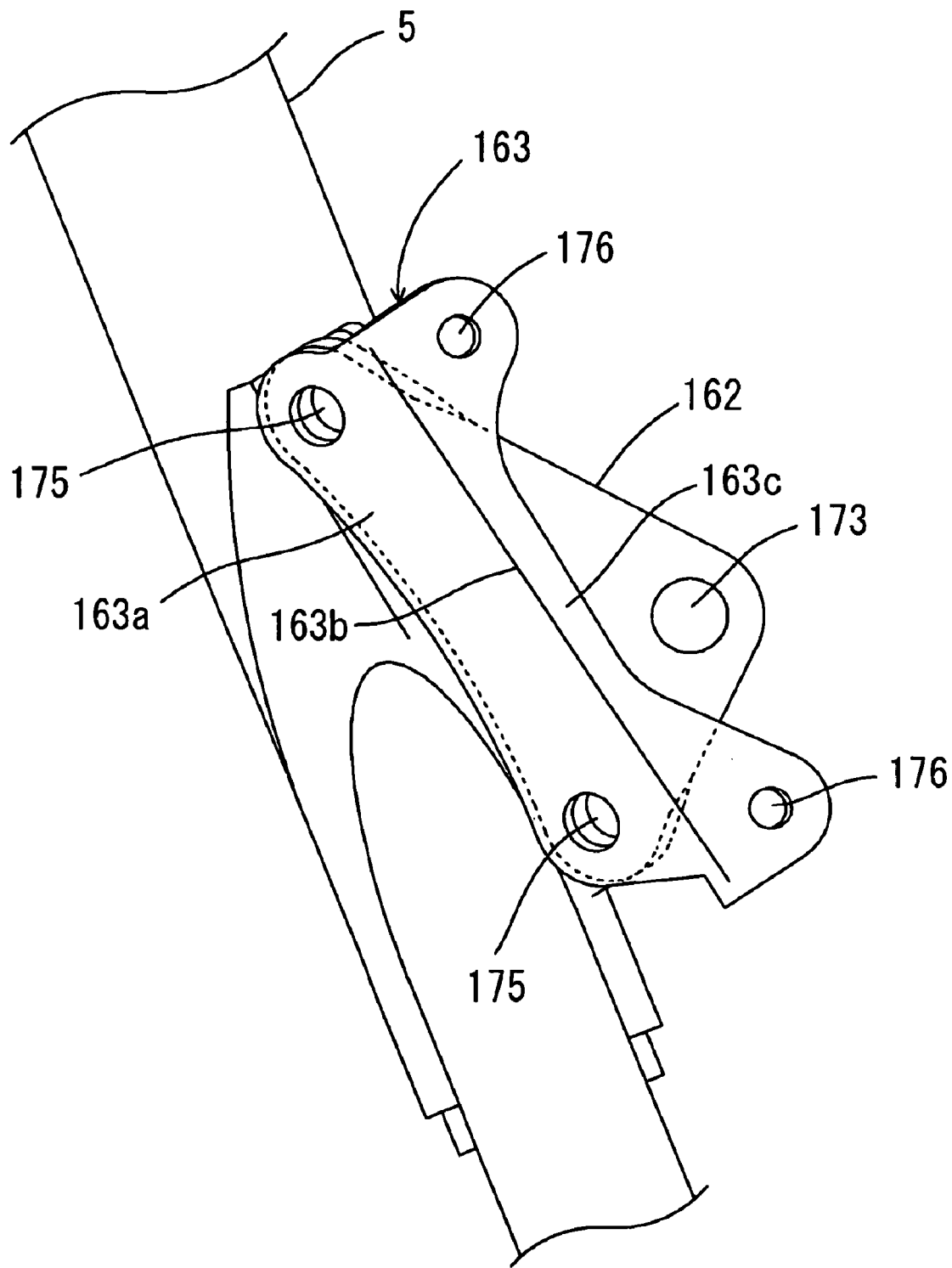
FIG. 29 is a side view illustrating the installation state of a third bracket.

As shown in FIG. 29, the third bracket 163 is laid on the front side of the second bracket 162. The third bracket 163 is a bent plate configured into a three sections from front to rear, and has a front part 163*a* extending along the front half part 162*a* of the second bracket 162, an intermediate part 162*b* extending outward from the front part 163*a*, and a rear part 163*c* extending inward from the intermediate part 162*b* (see FIG. 32). The front part 163*a* has bolt holes 175 at positions corresponding to the bolt holes 172 of the front half part 162*a* of the second bracket 162. The rear part 163*c* also has bolt holes 176 at its upper and lower end.

As shown in FIG. 32, bolts 177 are inserted through the bolt holes 171 of the first bracket 161, the bolt holes 172 of the second bracket 162 and the bolt holes 175 of the third bracket 163. The second bracket 162 and the third bracket 163 are secured together with the first bracket 161.

Figure 30:
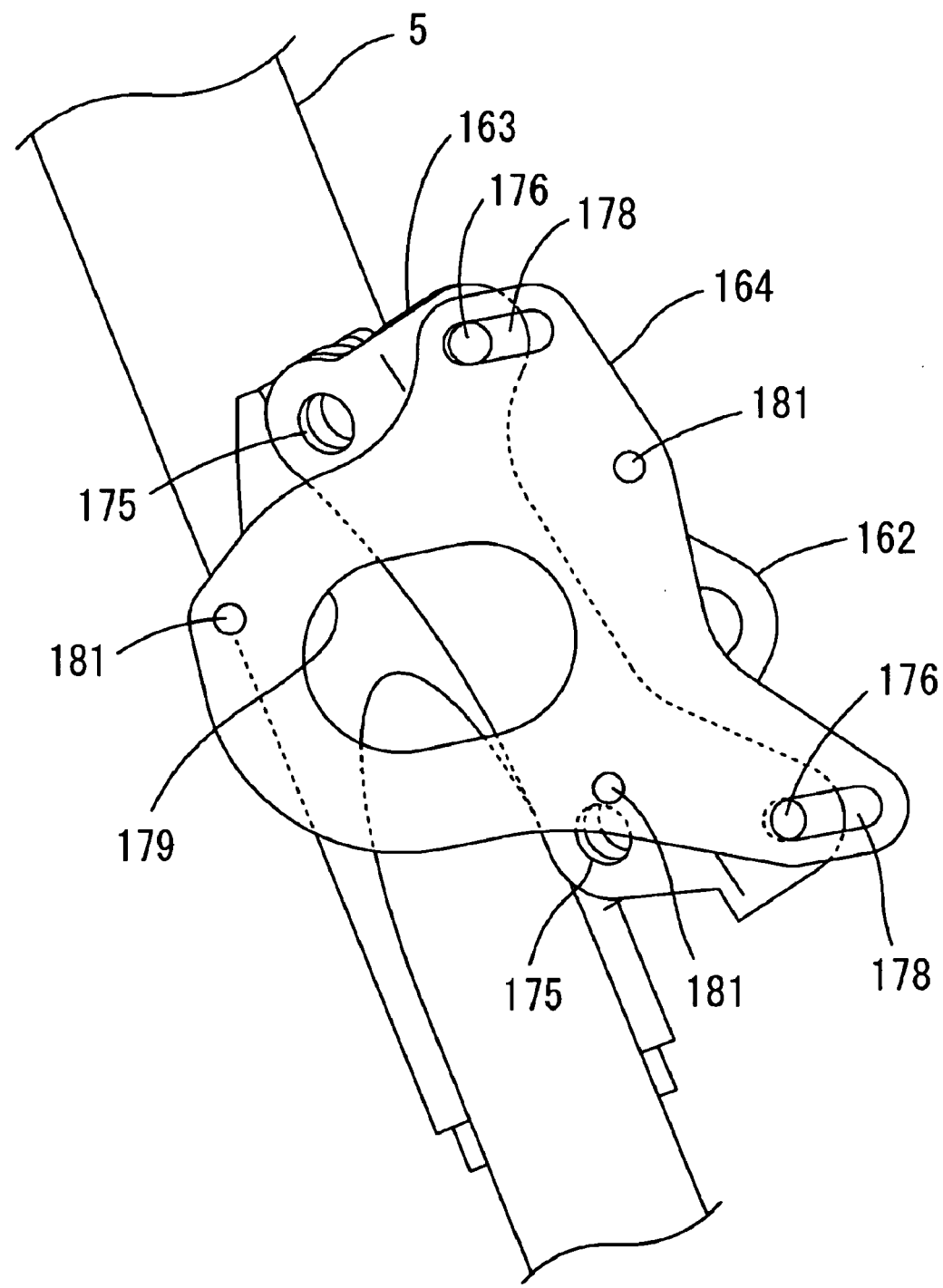
FIG. 30 is a side view illustrating the installation state of a mounting plate.

As shown in FIG. 30, the mounting plate 164 is laid on the front side of the rear part 163*c* of the third bracket 163. The mounting plate 164 is in the form of a flat plate (see FIG. 32). The mounting plate 164 has slots 178 preferably extending in the longitudinal direction at its upper and lower rear ends. The mounting plate 164 has a hole 179 having an oval shape at its center. The mounting plate 164 also has three bolt holes 181 through which bolts (not shown) for attaching the case body 53 of the clutch assist device 50 can be inserted.

Bolts 180 (see FIG. 32) are inserted through the bolt holes 176 of the third bracket 163 and the slots 178 of the mounting plate 164. The bolts 180 can be fixed at arbitrary positions in the slots 178. Therefore, by sliding the mounting plate 164 back or forth with the bolts 180 inserted through the slots 178, the longitudinal position of the mounting plate 164 with respect to the third bracket 163 can be finely adjusted with ease.

Figure 26:
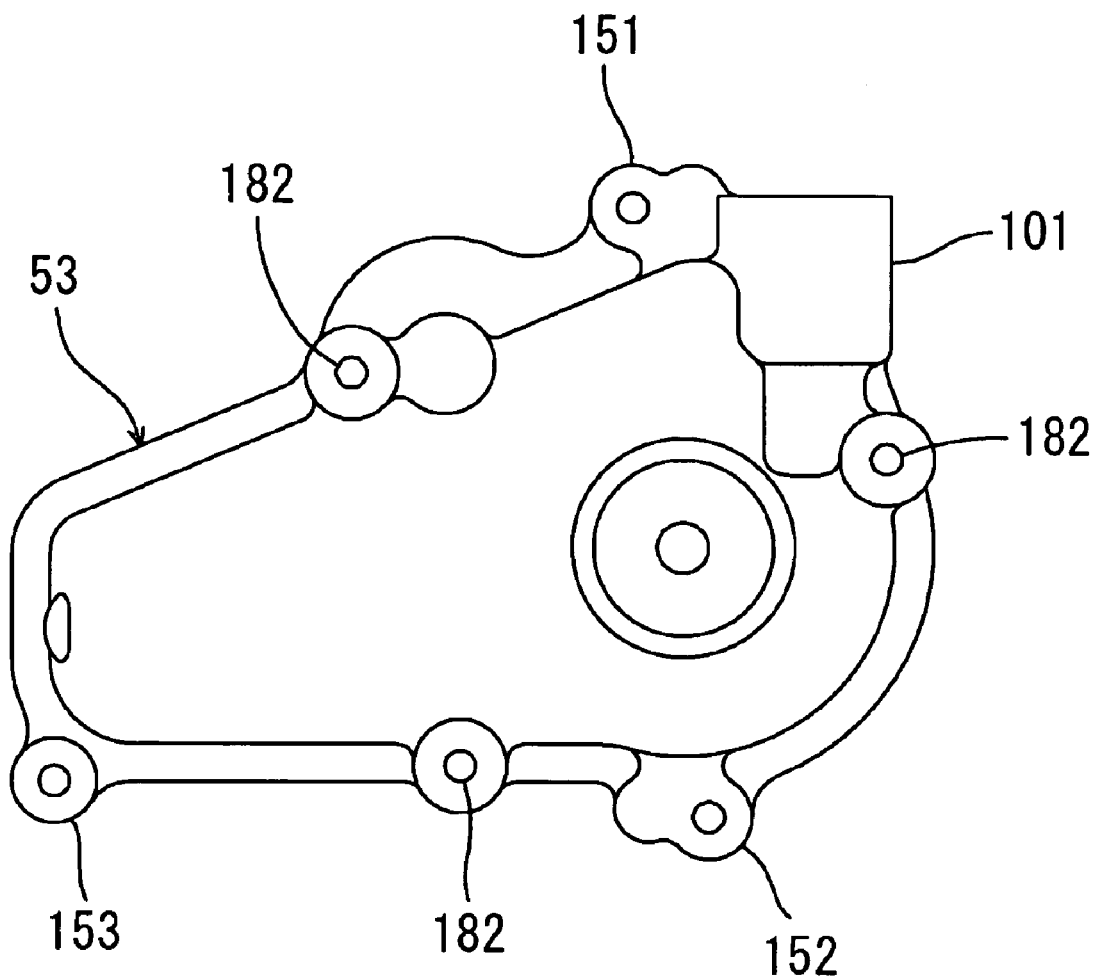
FIG. 26 is a reverse side view of a housing body of the second embodiment.

As shown in FIG. 26, three bolt holes 182 corresponding to the bolt holes 181 of the mounting plate 164 are formed in the reverse side of the case body 53 of the clutch assist device 50. The case body 53 is so positioned that the bolt holes 182 overlap the bolt holes 181 of the mounting plate 164 and are placed on the front side of the mounting plate 164 (see FIG. 32). Then, bolts (not shown) are threaded into the bolt holes 181 of the mounting plate 164 and the bolt holes 182 of the case body 53 to secure the case body 53 to the mounting plate 164. As described before, since the longitudinal position of the mounting plate 164 can be finely adjusted with ease, the longitudinal position of the case body 53 secured to the mounting plate 164 can be finely adjusted with ease. Therefore, the position of the case body 53 can be adjusted so that the case body 53 can be positioned in a desired position if needed after the case body 53 has been attached to the amounting plate 164.

After the mounting plate 164 has been attached to the case body 53, the case cover 54 is placed on the case body 53 and bolts are threaded into the bolt holes of the first, second and third fastening parts 151, 152 and 153 to secure the case cover 54 to the case body 53. Then, the first clutch wire 43a and the second clutch wire 43b are attached to the first rotatable member 57 through the opening 110 of the case cover 54.

Figure 31:
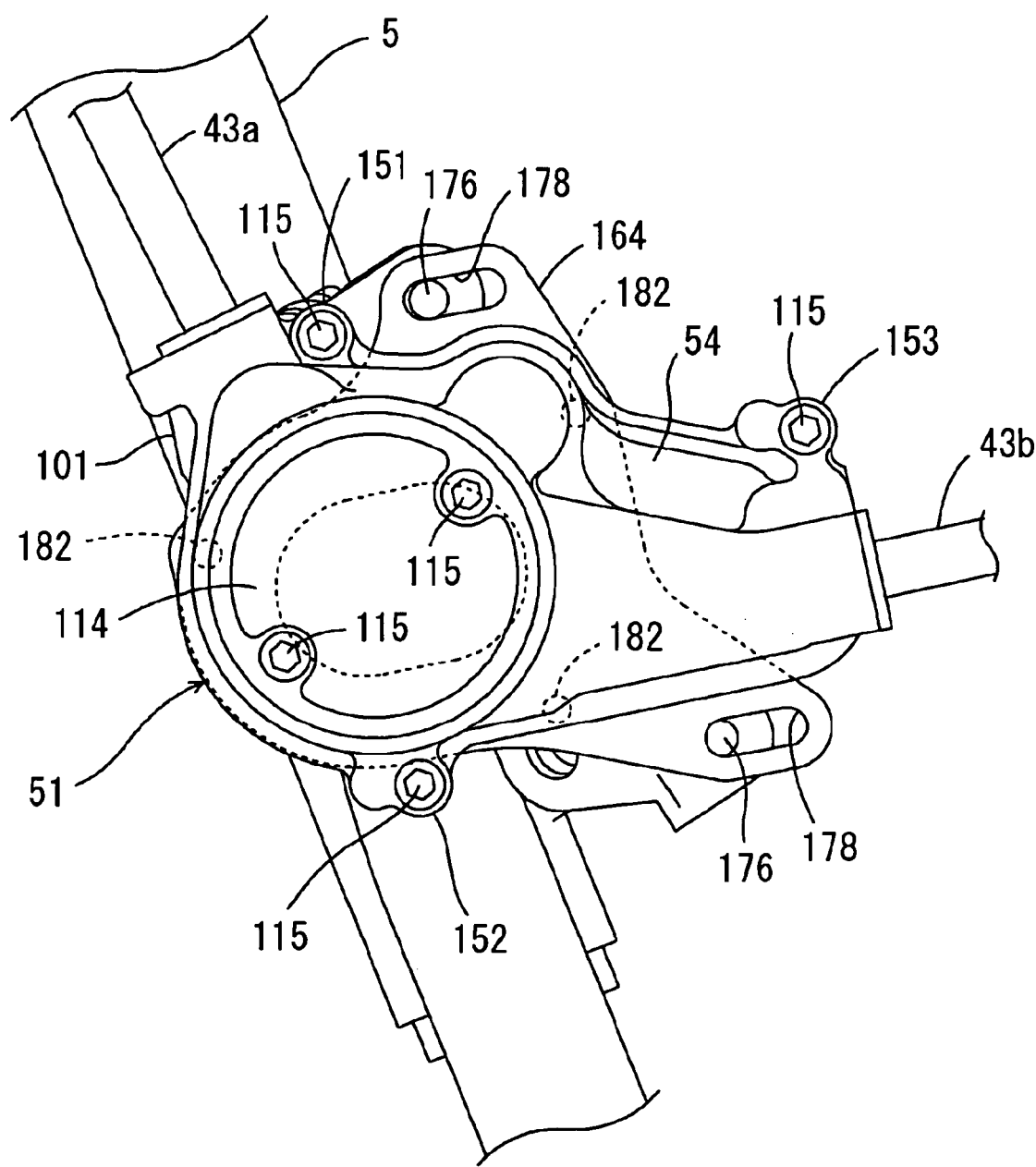
FIG. 31 is a side view illustrating the installation state of the operating assisting device as attached to the vehicle frame by the first, second and third brackets shown in FIGS. 27-30.
Figure 33:
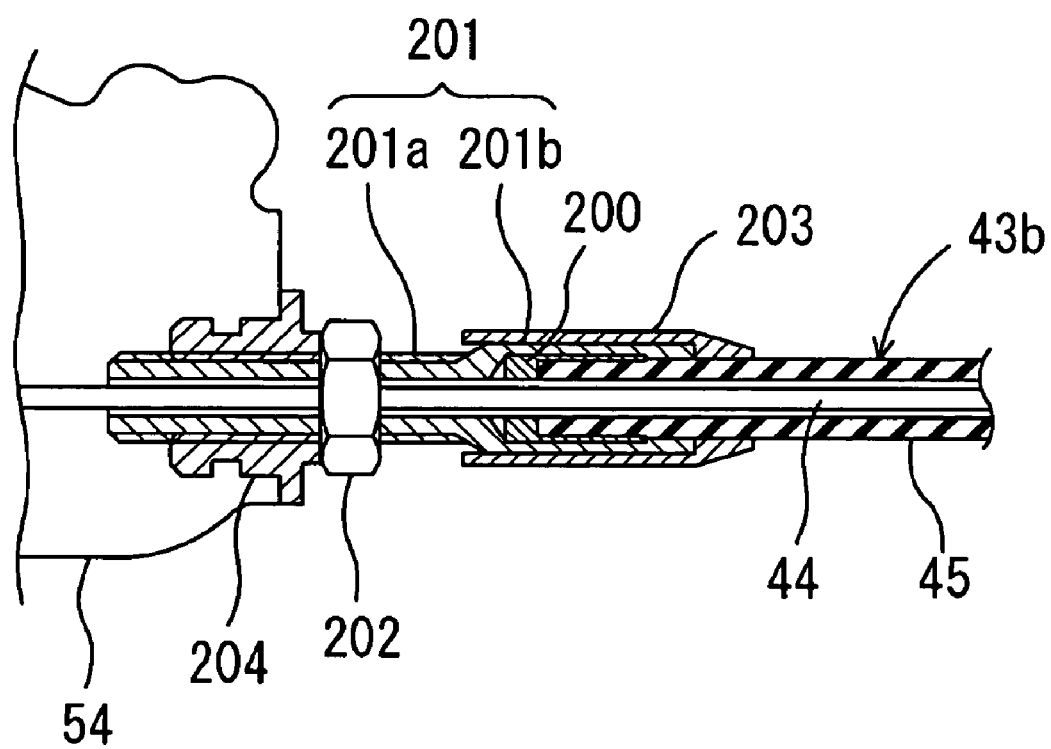
FIG. 33 is a cross-sectional view illustrating the structure of a connection between the clutch assist device and a portion of the clutch wire.

As shown in FIG. 33, an engaging element 200 with a cylindrical shape (which is not shown in FIG. 31 and so on) is secured to an end of the outer tube 45 of the second clutch wire 43b. The engaging element 200 may be bonded to the outer tube 45 or press-fitted over the outer tube 45. A block 204 with a screw hole is fixed in a wire introduction port of the case cover 54. A screw 201 extending in the longitudinal direction (lateral direction of FIG. 33) is threaded into the screw hole of the block 204.

The screw 201 has a threaded part 201a and a large diameter part 201b formed on the rear side of the threaded part 201a. The engaging element 200 is rotatably inserted in the large diameter part 201b. The large diameter part 201b has a step at its distal end so that the rear end of the engaging element 200 can be captured on the step and prevented from coming off from the large diameter part 201b. Therefore, when the screw 201 is moved back or forth by rotating it, the outer tube 45 moves back or forth together with the screw 201.

The screw 201 and the engaging element 200 have through holes through which the inner tube 44 can extend. The inner tube 44 of the second clutch wire 43b extends through the through holes of the engaging element 200 and the screw 201 and is connected to the first rotatable member 57. A cap 203 is attached over the outer periphery of the large diameter part 201b of the screw 201. The reference numeral 202 designates a nut for fixing the position of the screw 201.

The screw 201 is used to adjust the installation positions of the second clutch wire 43b and the clutch assist device 50. That is, after the outer tube 45 of the second clutch wire 43b has been attached at a predetermined position on the friction clutch 18 side, the bolts 180 are inserted into the bolt holes 176 of the third bracket 163 and the slots 178 of the mounting plate 164 and fastened to the extent that the clutch assist device 50 can be slid back and forth, as described before. Then, the length of the outer tube 45 of the second clutch wire 43b is so adjusted, by rotating the screw 201, that the positioning recess 119a of the first rotatable member 57 and the projection 119b of the case cover 54 align with each other. When the recess 119a and the projection 119b align with each other, the nut 202 is tightened to fix the position of the screw 201. The outer tube 45 of the second clutch wire 43b can be thereby set to an appropriate length. After that, the bolts 180 are tightened to fix the mounting plate 164 firmly. Then, the lid 114 is placed over the opening 110 of the case cover 54 and is secured to the support walls 111a, 111b of the case cover 54 by the bolts 115.

Also in this embodiment, a cam mechanism, having the cam groove 71 and the cam follower 79, is interposed between the first rotatable member 57 and the second rotatable member 58. Therefore, by properly determining the curve of the cam groove 71, the relation between the pendulum-like oscillation of the spring unit 59 and the rotation of the first rotatable member 57 can be freely set and desired operability can be achieved.

When the clutch lever 9 is moved from the disengage start position to the midpoint, the increasing rate of the urging force of the auxiliary spring 82 applied to the first rotatable member 57 can be high in the initial stage immediately after the disengage start position and then reduced. Therefore, since the assist force can be significantly large in the initial stage of the half-clutch operation, the operability can be improved.

Also, when the clutch lever 9 is moved from the disengage start position to the midpoint, the ratio between the load of the clutch spring 27 applied to the push lever 40 of the clutch release mechanism 28 and the actual load applied to the clutch lever 9 can be maintained within a fixed range. Therefore, the load applied to the clutch lever 9 when the clutch lever 9 is operated is smaller than the load applied to the push lever 40 and varies with a tendency similar to that of the load from the clutch spring 27. Therefore, the load in operating the clutch lever 9 can be reduced and natural and comfortable operating feel can be provided.

The spring unit 59 having the auxiliary spring 82 can oscillate about the pivot end 86 in a pendulum-like manner. Thus, since the direction in which the urging force of the spring 82 acts can be freely changed, the urging force can be applied in the appropriate direction. Therefore, although a cam mechanism is interposed between the spring unit 59 and the first rotatable member 57, the loss of the urging force of the auxiliary spring 82 applied to the first rotatable member 57 can be reduced. In addition, the wear of the assist mechanism 52 can be reduced, and the service life and reliability of the clutch assist device 50 can be improved.

The present invention is not limited to the embodiments described above, and various modifications can be made to the present invention without departing from the scope thereof.

For example, the operating element for operating the frictional clutch is not limited to a clutch lever to be operated by a hand and may be a clutch pedal to be operated by a foot.

In the embodiments described above, the first and second clutch wires 43a, 43b (more specifically, the inner wires 44 thereof) as first and second linear members are physically separated from each other. However, the first linear member and the second linear member are not necessarily separated from each other as long as they can be connected to the rotatable member 57. The first linear member and the second linear member may be joined together. That is, one side portion and other side portion of one linear member connected to the first rotatable member 57 may be regarded as the first linear member and the second linear member, respectively. In this case, although the first joint and the second joint may be located in different locations, the linear member may be connected to the first rotatable member 57 at one point so that the first and second joints can be located at the same position.

Additionally, as noted above, the auxiliary force member for applying an urging force to the first rotatable member 57 is not limited to the spring unit 59 having the auxiliary spring 82. Moreover, the auxiliary spring 82 is not limited to a compression spring which can apply an urging force in the direction in which it expands and may be a tension spring or a torsion spring which can apply an urging force in the direction in which it contracts. The canceling elastic member for applying a canceling force to cancel the urging force of the auxiliary spring 82 when the clutch lever 9 is between the return position and the disengage start position is not limited to the canceling spring unit 100 having the canceling spring 105. A different type of elastic member, such as an air spring, may be used for the auxiliary elastic member or the canceling elastic member.

In the embodiments described above, the movable member which moves in synchronization with the clutch lever 9 is the rotatable member 57 rotatable about a specific rotating shaft (pivot shaft 63). Therefore, the clutch assist device 50 can be simplified in structure and have high ruggedness. The movable member which moves in synchronization with the clutch lever 9 is not limited to such a rotatable member, though. For example, the movable member may be a slidable member that can be reciprocated along a direction (linearly or in a curve) or the like. When the movable member is a member which can be reciprocated along a direction, the traveling speed of the movable member can be specified as, for example, a velocity in the direction. Therefore, the velocity ratio, which is the ratio of the traveling velocity of the rotatable member to the traveling velocity of the movable member, can be specified, for example, as the ratio between the velocity of the movable member in the above direction and the angular velocity of the rotatable member.

The component for generating the assist force in the assist mechanism 52 is not limited to an elastic member such as the auxiliary spring 82 and may be a motor or the like.

In addition, the friction clutch is not limited to a multi-plate wet clutch and may be a single-plate dry clutch. In addition, the clutch release mechanism is not limited to rack-and-pinion type. The present invention can be implemented when the clutch release mechanism is ball screw type or cam type.

Figure 35:
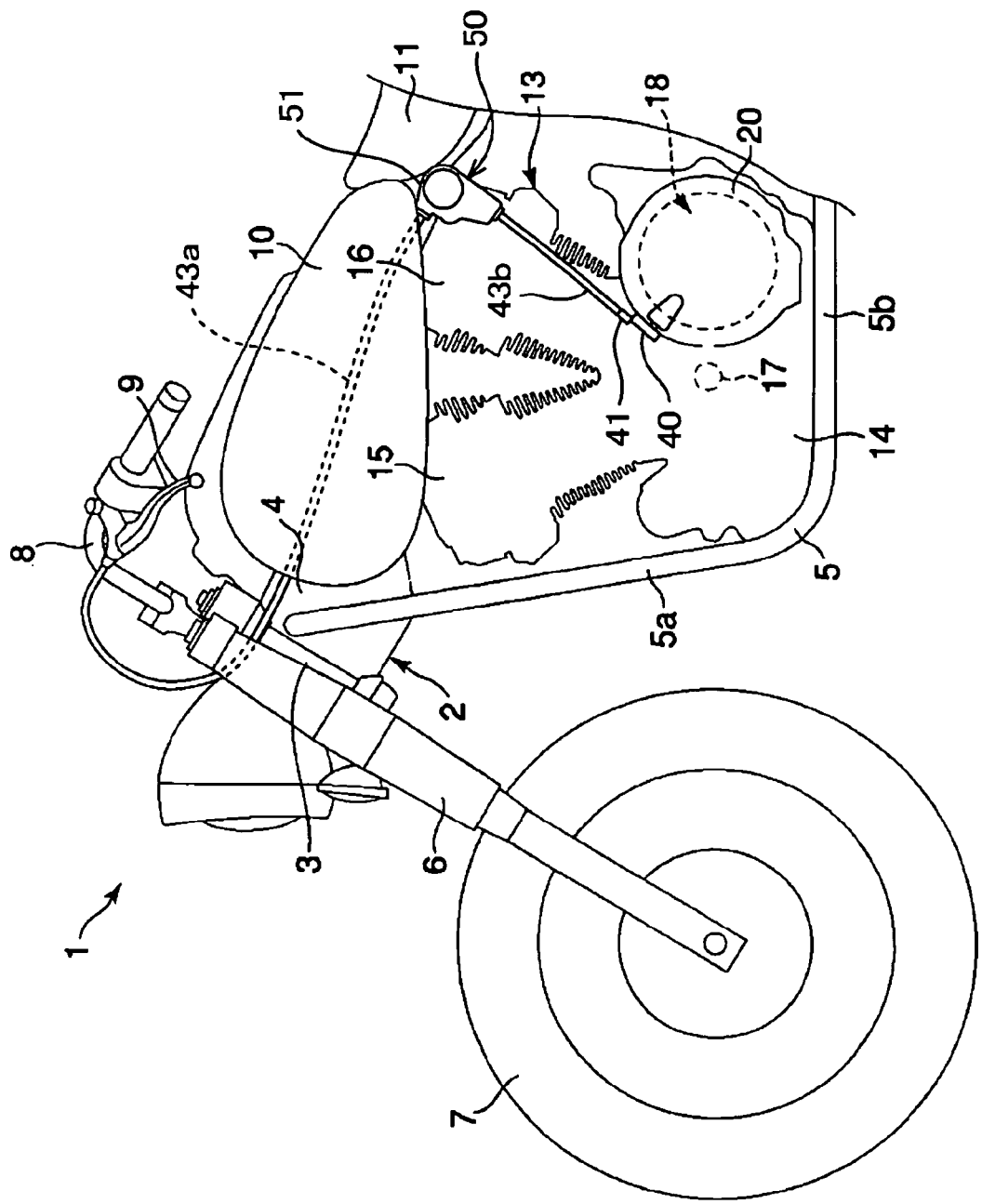
FIG. 35 is a side view of a motorcycle showing another possible position for locating the clutch assist device on the motorcycle.

In the embodiments described above, the clutch assist device 50 is supported by the down tube 5 of the frame 2. However, the installation position of the clutch assist device 50 is not specifically limited. For example, the clutch assist device 50 may be located below the fuel tank 10 or the seat 11 with the first clutch wire 43a extending in the longitudinal direction as shown in FIG. 35.

Although not shown, the clutch assist device 50 may be located in the vicinity of the friction clutch 18. The exterior case 51 of the clutch assist device 50 may be attached to the clutch cover 20.

Figure 36:
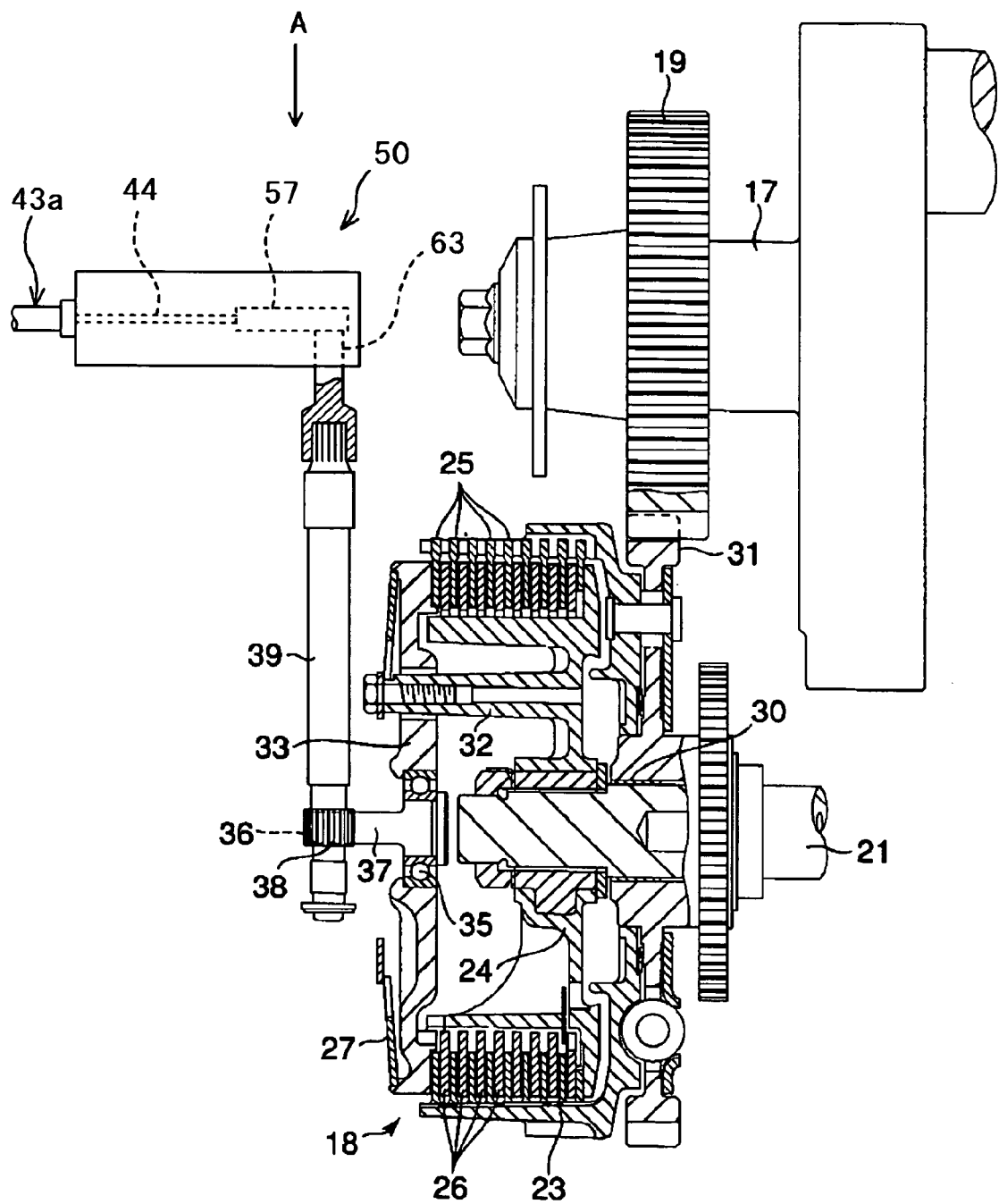
FIG. 36 is a cross-sectional view illustrating the connection structure between the operation assisting device and the friction clutch in another modification.
Figure 37:
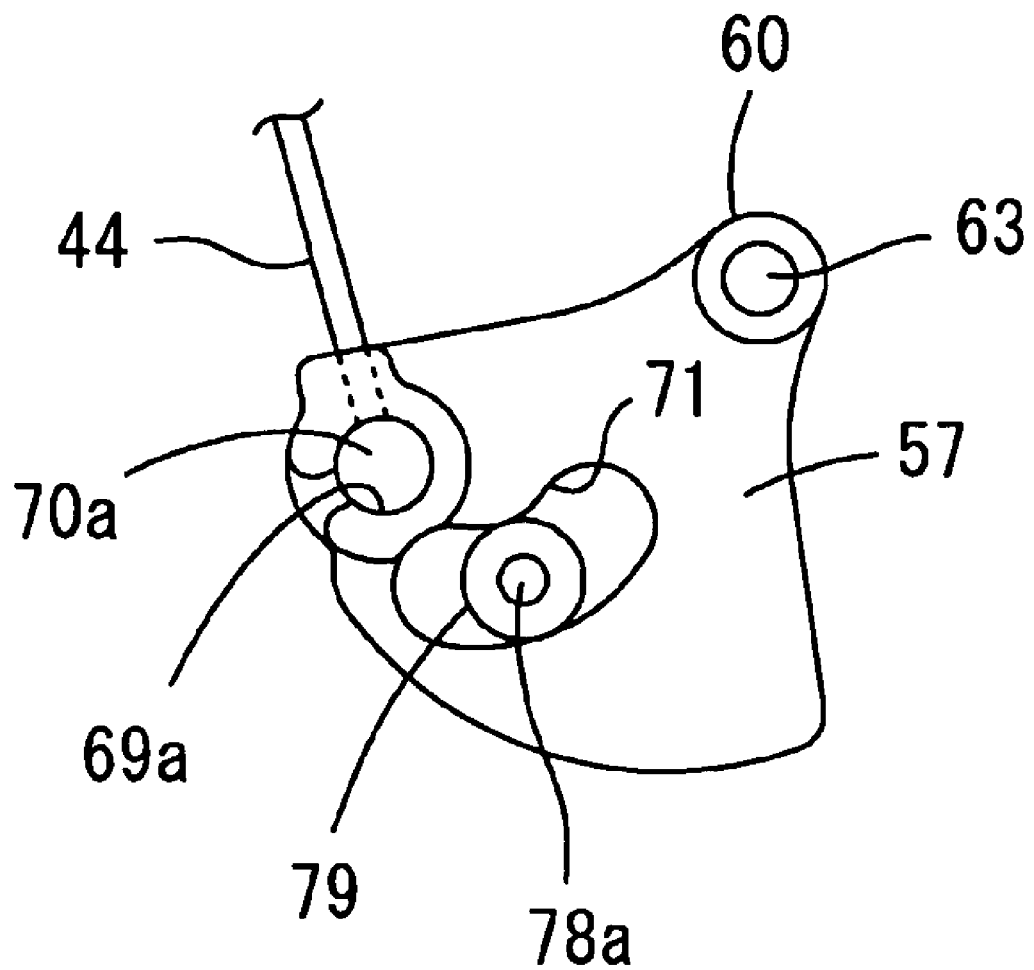
FIG. 37 is a view of the connection illustrated in FIG. 36 as seen in the direction of the arrow A of FIG. 36.

As shown in FIG. 36 and FIG. 37, the second clutch wire 43b may be omitted and a shaft coaxially extending from the push lever shaft 39 may be used as a pivot shaft 63 as the rotatable shaft for the first rotatable member 57. This configuration can create an effect almost the same as those of the embodiments described above.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A clutch mechanism for a vehicle comprising a clutch assist device operating between a clutch and a clutch operator, the clutch operator being connected to the clutch by a transmitting component, the clutch including a clutch element being biased by a clutch spring toward an engaged position and being movable by the clutch operator and the transmitting component from the engaged position to a disengaged position, the clutch assist device comprising an auxiliary force member which is disposed relative to the transmitting component, at least when the clutch operator is moved to disengage the clutch element, to apply an assist force to the transmitting component in such a direction as to assist disengaging the clutch element while the clutch operator is moved from a disengage start position, at which point the clutch operator works against the bias of the clutch spring, to a disengaged position where the clutch element is in the disengaged position, wherein the assist force of the auxiliary force member applied to the transmitting component is maintained within a fixed range while the clutch operator is moved from an intermediate position, lying between the disengage start position and the disengaged position, to the disengage position, wherein the clutch has a clutch release mechanism, and the transmitting component has a first clutch wire connected to the clutch operator and a second clutch wire connected to the clutch release mechanism, and wherein the clutch assist device is disposed between the first clutch wire and the second clutch wire.

2. The clutch mechanism of claim 1, wherein the auxiliary force member urges the transmitting component toward a position corresponding to the engaged position of the clutch when the clutch operator is in a return position, and the direction of the assist force applied to the transmitting component is changed from such a direction to a direction assisting disengagement of the clutch when the clutch operator is moved toward the disengaged position from the return position through the disengage start position, additionally comprising a canceling force member, which applies an urging force to cancel the urging force of the auxiliary force member that is applied to the transmitting component when the clutch operator is initially moved from the return position toward the disengage start position.

3. The clutch operation assisting device of claim 1, wherein the clutch assist device is configured to directly transmit displacement of the first clutch wire to the second clutch wire such that the displacements of the first and second clutch wires are equal to each other at the time when the clutch operator is actuated.

4. A clutch assist device operating between a clutch and a manual clutch operator, the clutch operator being connected to the clutch by a transmitting component, the clutch including a clutch element being biased by a clutch spring toward an engaged position and being movable by the clutch operator and the transmitting component from the engaged position to a disengaged position, the clutch assist device comprising:
   a movable member movable in synchronization with the transmitting component,
   auxiliary force member which is disposed relative to the transmitting component to apply an assist force to the transmitting component, at least when the clutch operator is moved to disengage the clutch element, in such a direction as to assist disengaging the clutch element while the clutch operator is moved from a disengage start position, at which point the clutch operator works against the bias of the clutch spring, to a disengaged position where the clutch element is in the disengaged position,
   a rotatable member for transmitting the urging force of the auxiliary force member to the movable member; and
   a cam mechanism being interposed between the movable member and the rotatable member, the cam mechanism including a cam surface configured to maintain the urging force applied by the rotatable member to the movable member within a fixed range while the clutch operator is moved from an intermediate position between the disengage start position and the disengaged position to the disengaged position;
   wherein the transmitting component has a first clutch wire connected to the clutch operator and a second clutch wire connected to a clutch release mechanism of the clutch, and wherein the first and second clutch wires are connected to the movable member.

5. The clutch assist device of claim 4, wherein the cam mechanism has a cam groove formed through one of the movable member and the rotatable member that defines the cam surface, and a cam follower being in contact with the cam groove and supported by the other of the movable member and the rotatable member.

6. The clutch operation assisting device of claim 5, wherein the auxiliary force member comprises a spring, and the cam groove in conjunction with the cam follower are configured to restrain the spring from expanding or contracting freely while the clutch operator is moved from the intermediate position to the disengaged position.

7. The clutch mechanism of claim 4, wherein the auxiliary force member urges the transmitting component toward a position corresponding to the engaged position of the clutch when the clutch operator is in a return position, and the direction of the assist force applied to the transmitting component is changed from such a direction to a direction assisting disengagement of the clutch when the clutch operator is moved toward the disengaged position from the return position through the disengage start position, additionally comprising a canceling member, which applies an urging force to cancel the urging force of the auxiliary force member that is applied to the transmitting component when the clutch operator is initially moved from the return position toward the disengage start position.

8. The clutch operation assisting device of claim 7, wherein the urging force of the clutch spring applied to the movable member is zero and the rotatable member receives the urging force of the canceling force member while the clutch operator is moved from the return position to the disengaged start position.

9. The clutch operation assisting device of claim 7, additionally comprising a stopper for receiving the rotatable member when the clutch operator is in the return position, the stopper being urged by the canceling force member.

10. A clutch assist device incorporated in a clutch mechanism having a friction clutch with a clutch spring, a transmitting component connected to the friction clutch, and a clutch operator which is connected to the transmitting component and which changes the engagement state of the friction clutch when operated against the urging force of the clutch spring, the clutch assist device comprising:
   a movable member movable in synchronization with the clutch operator;
   a rotatable member;
   an auxiliary elastic member for applying an urging force to rotate the rotatable member, the auxiliary elastic member being pivotal through a fixed path with movement of the movable member; and
   a cam mechanism interposed between the movable member and the rotatable member for transmitting the urging force applied to the rotatable member to the movable member,
   wherein, when the clutch operator is operated in such a direction as to disengage the friction clutch, the auxiliary elastic member applies an urging force to move the movable member in such a direction as to assist disengaging the friction clutch while the clutch operator is moved from a disengage start position, at which point the clutch operator works against the bias of the clutch spring, to a disengaged position where the clutch element is in the disengaged position, and wherein the cam mechanism is configured to change a velocity ratio, which is the ratio of the rotational velocity of the rotatable member to the traveling velocity of the movable member, while the clutch operator is moved from the disengage start position to the disengaged position.

11. The clutch operation assisting device of claim 10, wherein the velocity ratio at the time when the clutch operator is at the disengage start position is greater than that at the time when the operating element is in the disengaged position.

12. The clutch operation assisting device of claim 10, wherein the average of the velocity ratio at the time when the clutch operator is moved from the disengage start position to an intermediate position between the disengage start position and the disengaged position is greater than the average of the velocity ratio at the time when the clutch operator is moved from the intermediate position to the disengaged position.

13. The clutch operation assisting device of claim 10, wherein the cam mechanism is configured to gradually decrease the velocity ratio while the clutch operator is moved from the disengage start position to the disengaged position.

14. The clutch operation assisting device of claim 10, wherein the movable member is a second rotatable member.

15. The clutch operation assisting device of claim 10, wherein the cam mechanism has a cam groove formed through one of the movable member and the rotatable member, and a cam follower being in contact with the cam groove and supported by the other of the movable member and the rotatable member.

16. The clutch operation assisting device of claim 10, wherein the auxiliary force member comprises a spring.

17. A clutch assist device incorporated in a clutch mechanism having a friction clutch with a clutch spring, a transmitting component connected to the friction clutch, and a clutch operator which is connected to the transmitting component and which changes the engagement state of the friction clutch when operated against the urging force of the clutch spring, the clutch assist device comprising:
   a movable member movable in synchronization with the clutch operator;
   a rotatable member;
   an auxiliary elastic member for applying an urging force to rotate the rotatable member, the auxiliary elastic member being pivotal through a fixed path with movement of the movable member; and
   a cam mechanism interposed between the movable member and the rotatable member for transmitting the urging force applied to the rotatable member to the movable member,
   wherein, when the clutch operator is operated in such a direction as to disengage the friction clutch, the auxiliary elastic member applies an urging force to move the movable member in such a direction as to assist disengaging the friction clutch while the clutch operator is moved from a disengage start position, at which point the clutch operator works against the bias of the clutch spring, to a disengaged position where the clutch element is in the disengaged position, and wherein the cam mechanism is configured to maintain a ratio between the reactive force of the clutch spring and the load applied to the clutch operator within a preset range while the clutch operator is moved from the disengaged start position to an intermediate position between the disengage start position and the disengaged position.

18. A clutch assist device incorporated in a clutch mechanism having a friction clutch with a clutch spring, a transmitting component connected to the friction clutch, and a clutch operator which is connected to the transmitting component and which changes the engagement state of the friction clutch when operated against the urging force of the clutch spring, the clutch assist device comprising:
   a movable member movable in synchronization with the clutch operator;
   a rotatable member;
   an auxiliary elastic member for applying an urging force to rotate the rotatable member, the auxiliary elastic member being pivotal through a fixed path with movement of the movable member; and
   a force transmitting component interposed between the movable member and the rotatable member for transmitting the urging force caused by the auxiliary elastic member which the rotatable member receives to the movable member,
   wherein, when the clutch operator is operated in such a direction as to disengage the friction clutch, the auxiliary elastic member applies an urging force to move the movable member in such a direction as to disengage the friction clutch while the clutch operator is moved from a disengage start position to a disengaged position, and
   wherein the urging force transmitting component is configured to change a velocity ratio, which is the ratio of the rotational velocity of the rotatable member to the traveling velocity of the movable member, while the clutch operator is moved from the disengage start position to the disengaged position.

* * * * *